(12) United States Patent
Pong et al.

(10) Patent No.: US 11,044,544 B2
(45) Date of Patent: *Jun. 22, 2021

(54) HEADPHONES WITH INTERACTIVE DISPLAY

(71) Applicants: Ronald Pong, To Kwa Wan (HK);
King Hei Liu, Po Sheung Tsuen (HK);
Wing Pun Leung, Alhambra, CA (US)

(72) Inventors: Ronald Pong, To Kwa Wan (HK);
King Hei Liu, Po Sheung Tsuen (HK);
Wing Pun Leung, Alhambra, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/549,381

(22) Filed: Aug. 23, 2019

(65) Prior Publication Data
US 2020/0053450 A1  Feb. 13, 2020

Related U.S. Application Data

(63) Continuation of application No. 15/695,600, filed on Sep. 5, 2017, now Pat. No. 10,433,044, which is a
(Continued)

(51) Int. Cl.
*H04R 1/10* (2006.01)
*G06F 1/16* (2006.01)
(Continued)

(52) U.S. Cl.
CPC ........... *H04R 1/1041* (2013.01); *G06F 1/163* (2013.01); *G06F 1/1654* (2013.01);
(Continued)

(58) Field of Classification Search
CPC .. H04R 5/033; H04R 2420/07; H04R 1/1008; H04R 1/1066; H04R 1/10; H04R 1/105;
(Continued)

(56) References Cited

U.S. PATENT DOCUMENTS 5,606,743 A * 2/1997 Vogt ..................... H04B 1/086
16/228
5,815,126 A * 9/1998 Fan ..................... G02B 27/017
345/7

(Continued)

*Primary Examiner* — Norman Yu
(74) *Attorney, Agent, or Firm* — Larry E. Henneman, Jr.; Henneman & Associates, PLC

(57) ABSTRACT

A novel headphone system includes a first speaker assembly, a second speaker assembly, and an interactive visual display system. The interactive visual display system includes a display operative to output visual contents according to interaction with a user. In one embodiment, one of the displays can be a transparent display placed in front of the user's eyes. Live images passing through the transparent display can be merged with the digital image generated by the transparent display to give the user an augmented reality experience. In another embodiment, the headphone system includes an external device interface that enables a user to interact with the contents displayed from the screen via an external device or via the Internet. In another embodiment, the interactive visual display system is removable from the rest of the headphone system and can optionally be installed in another compatible non-headphone device.

20 Claims, 15 Drawing Sheets

Related U.S. Application Data continuation-in-part of application No. 15/263,179, filed on Sep. 12, 2016, now Pat. No. 9,756,414, which is a continuation of application No. 13/956,913, filed on Aug. 1, 2013, now Pat. No. 9,445,172.

(60) Provisional application No. 61/678,955, filed on Aug. 2, 2012.

(51) Int. Cl.
| | | |
|---|---|---|
| *G06F 3/0346* | (2013.01) | |
| *G06F 3/0488* | (2013.01) | |
| *G06F 3/16* | (2006.01) | |
| *H04N 5/232* | (2006.01) | |
| *H04R 1/02* | (2006.01) | |
| *H04R 27/00* | (2006.01) | |

(52) U.S. Cl.
CPC ........ *G06F 3/0346* (2013.01); *G06F 3/04883* (2013.01); *G06F 3/165* (2013.01); *H04N 5/23203* (2013.01); *H04N 5/23206* (2013.01); *H04N 5/23293* (2013.01); *H04R 1/028* (2013.01); *H04R 1/1008* (2013.01); *H04R 1/1058* (2013.01); *H04R 1/1066* (2013.01); *H04R 1/1091* (2013.01); *H04R 27/00* (2013.01); *H04R 2227/003* (2013.01); *H04R 2420/09* (2013.01); *H04R 2460/07* (2013.01)

(58) Field of Classification Search
CPC .. H04R 1/1075; H04R 25/552; H04R 25/554; H04R 5/0335; G02B 27/017; A61B 5/02438; A61B 5/6898; H04S 2400/13; H04S 7/304

USPC ............... 381/74, 300, 370; 455/569.1, 41.3, 455/575.1, 575.2, 575.6

See application file for complete search history.

(56) References Cited

U.S. PATENT DOCUMENTS

| | | | |
|---|---|---|---|
| 2005/0047322 A1* | 3/2005 | Sondur | H04B 7/0697 370/203 |
| 2006/0258289 A1* | 11/2006 | Dua | G06F 16/44 455/41.3 |
| 2009/0088204 A1* | 4/2009 | Culbert | G06F 3/0346 455/556.1 |
| 2009/0097689 A1* | 4/2009 | Prest | H04R 1/028 381/380 |
| 2009/0214060 A1* | 8/2009 | Chuang | A61B 5/0478 381/151 |
| 2009/0323975 A1* | 12/2009 | Groesch | H04R 1/1091 381/71.1 |
| 2011/0096939 A1* | 4/2011 | Ichimura | H04S 7/304 381/74 |
| 2011/0134016 A1* | 6/2011 | Foxenland | G02B 27/017 345/8 |
| 2013/0117693 A1* | 5/2013 | Anderson | H04L 65/4069 715/753 |
| 2013/0136293 A1* | 5/2013 | Lee | H04R 5/0335 381/378 |
| 2015/0358720 A1* | 12/2015 | Campbell | H04R 1/1091 381/151 |
| 2018/0217798 A1* | 8/2018 | Urbach | G09G 3/001 |

* cited by examiner

HEADPHONES WITH INTERACTIVE DISPLAY

CROSS-REFERENCE TO RELATED APPLICATIONS

This application is a continuation of U.S. patent application Ser. No. 15/695,600, filed Sep. 5, 2017 and having at least one common inventor, which is a continuation-in-part of U.S. patent application Ser. No. 15/263,179 (now U.S. Pat. No. 9,756,414), filed Sep. 12, 2016 and having at least one common inventor, which is a continuation of U.S. patent application Ser. No. 13/956,913 (now U.S. Pat. No. 9,445,172), filed Aug. 1, 2013 and having at least one common inventor, which claims the benefit of U.S. Provisional Patent Application Ser. No. 61/678,955, filed Aug. 2, 2012 and having at least one common inventor, all of which are incorporated by reference herein in their entireties.

BACKGROUND OF THE INVENTION

Field of the Invention

This invention relates generally to audio electronics, and more particularly to audio headphones.

Description of the Background Art

As consumer electronics become more and more commonplace in modern society, the demand for personal audio headphones continues to increase. In response to the increasing demand, there has been a recent surge in the design and development of headphones. Indeed, headphone developers continuously seek new and improved designs and features that appeal to consumers.

One approach to making a product more appealing to consumers has been to incorporate some type of aesthetic feature into the headphone design. For example, some designs include interchangeable color/design plates that allow a user to customize the appearance of the headphones. Other designs include light emitting diode (LED) systems that add aesthetic appeal to the headphone.

Although both design approaches add to the overall aesthetics of headphones, both have their disadvantages. For example, headphones with interchangeable color/design plates are limited in that they can only display content (e.g., color, pattern, image, etc.) that is available on the interchangeable color/design plates. Similarly, LED systems typically only display predetermined lighting schemes which, again, are limited to those made available by the manufacturer of the LED system. Such aesthetic changes are also not very useful to the consumer beyond the ability to change the appearance of the headphones.

SUMMARY

Aspects of the present invention provide a headphone system that is capable of interactively displaying content either defined by a user or by other parameters including, but not limited to, GPS location, motion of the user, sound, voices, images in the vicinity, and/or commands from authorized Internet sites or nearby devices via wireless communications. Ultimately, users can use their own brain waves to control the headphone display interactively. Aspects of the present invention improve on the prior art and transform headphones into a sophisticated interactive display platform, in addition to reproducing music and sound. As a result, the headphones of this invention can also be a useful tool for a user to publicly express his/her feelings to peers in close proximity via the headphone display in the form of static, animated or interactive images or videos.

An objective of the present invention is to provide a portable and interchangeable display platform which could be worn over the head. The contents of the display can be programmable and/or be interactive with a separate external controlling device (e.g. Smartphone or Tablet) nearby. One advantage of the display is that it can provide a visual attraction and/or communications to people around it.

An example embodiment of the present invention puts the portable and/or interchangeable display platform on the two sides of the headphones and on the headband that holds the headphones together. The three displays, one on the left headphone, one on the right headphone, and one on the headband, form an integrated interactive display platform. Another example embodiment includes only the headband display, or the left and right headphone display. Such embodiments would simplify the implementation and reduce the cost of the interactive display headphones.

The headphones and the display platform of an example embodiment have a link to an external standalone controlling device. This external controlling device can supply the necessary audio signal for the headphones to play and to deliver a proper video or static/animated image signal for the display platform to display. This link can be a physical link (e.g., physical wires) or a wireless link (e.g., Bluetooth, ZigBee, Wi-Fi, NFC, 3G/4G, etc.) connecting to the external device. This external device can also be used for turning on/off and/or to configure various functions such as noise cancellation, loudness control, spectrum equalizer or other signal processing functions that the headphones may have.

The display platform, similar to a microcomputer, has its own central processing unit (CPU), memory, storage and necessary interfaces to perform the display functions based on the information and instructions sent by the external device via the link connecting the controlling device and the headphone/display platform. The contents sent over the link may be stored in the internal storage first and then displayed in a way determined by the instructions sent. If a camera is installed in the display platform, the display can also show video or images captured by the camera. If "touch screen" input function is available on the display, it can be used to control various headphone functions, such as noise cancellation, adjustment of frequency responses and other signal processing functions. A gyroscope can be included in the display platform so that the orientation of the display can be adjusted automatically depending on the orientation of the head of the user. Global positioning system (GPS) information supplied by a sensor built inside the headphones or by the external controlling device allows the display and/or headphones to present location sensitive sound/voice, images or videos. A Motion Sensor built in the headphones detects the motion of the user which could allow the display to be interactive with the user's motion.

An example headphone system includes a frame having a first region, a second region, and an intermediate region. The system additionally includes a first speaker assembly coupled to the first region of the frame, a second speaker assembly coupled to the second region of the frame, a display coupled to the frame, a controller coupled to the frame, and memory. A user interface is operative to receive input from a user. The memory stores data and code, and the controller is responsive to the user input, and operative to execute the code and display images on the display based at least in part on the user input.

In an example embodiment, the user interface includes a data communication interface operative to facilitate data communication between the headphone system and an external system. In addition, the user interface includes an input sensor coupled to the frame. The controller responsive to input from the input sensor is operative to provide control signals to the external device via the data communication interface.

Optionally, the controller is operative to control the headphone system based at least in part on instructions received from the external system via the data communication interface. In an example embodiment, the data communication interface is configured to receive audio control instructions, display control instructions, and/or camera control instructions (where the headphone system includes a camera) from the external system. The controller and the communication interface facilitate real-time control of the headphone system by the external system.

In an example embodiment, the data communication interface is configured to communicate with the external system via a wired connection. Optionally, the data communication interface includes a short-range or long-range wireless system configured to communicate with the external system.

The data communication interface is configured to receive audio signals from the external system and the first speaker assembly is operative to output sound indicative of the audio signals in real-time. Optionally, the controller is configured to receive digital audio data via the data communication interface and to store the digital audio data in the memory. As another option, the data communication interface is configured to receive display signals from the external system, and the controller is configured to display images on the display based on the display signals in real-time. As yet another option, the controller is configured to receive display data via the communication interface and store the display data in the memory.

In an example embodiment, the controller, the memory, and the display are embodied in a first detachable display unit, which is removably coupled to the frame by mounting the unit to the first speaker assembly. In a particular embodiment, the first speaker assembly includes a first electrical contact, and the first detachable display unit includes a complementary second electrical contact. The first electrical contact and the complementary second electrical contact are adapted to electrically contact one another. The first detachable display unit is adapted to rotate relative to the first speaker assembly about an axis when the first detachable unit is attached to the first speaker assembly. One of the first electrical contact and the complementary second contact includes a substantially annular (or arc-shaped) electrical conductor formed at least partially about the axis, and the annular conductor is adapted to slidably engage the other of the first electrical contact and the complementary second electrical contact while the first detachable display unit is being rotated with respect to the first speaker assembly. The other of the first electrical contact and the complementary second electrical contact is a conductive biasing member adapted to exert force on the annular conductor, the force being sufficient to maintain electrical contact with the annular conductor while the first detachable display unit is being rotated with respect to the first speaker assembly. In a particular embodiment, the first speaker assembly includes a first thread set and the first display unit includes a complementary second thread set. The first thread set and the second thread set facilitate the engagement of the display unit with the first speaker assembly.

Optionally, the headphone system additionally includes a second detachable display unit having a second display, and the display and the second display are cooperatively controlled by the controller. In a particular embodiment, the first detachable display unit is adapted to engage the first speaker assembly (e.g., coupled to the frame via the first speaker assembly), and the second detachable display unit is adapted to engage the second speaker assembly (e.g., coupled to the frame via the second speaker assembly). In a more particular embodiment, the headphone system further includes a third display unit having a third display, and the third display unit is mounted to the intermediate region of the frame. The display, the second display, and the third display are cooperatively controlled by the controller.

The controller can be operative to display static content or video on the display.

Optionally the headphone system additionally includes a camera coupled to the frame.

In an example embodiment, the user interface includes an input sensor coupled to the frame, and the controller is operative to control the headphone system based at least in part on input from the input sensor. For example, the controller can display images on the display based at least in part on the input from the input sensor. As another example, the controller can control the operation of at least one of the first speaker assembly and the second speaker assembly based at least in part on the input from the input sensor. In embodiments that include a camera, the controller can control the operation of the camera based at least in part on the input from the input sensor.

The input sensor can include a sound sensor (e.g., a microphone), an orientation sensor (e.g., a gyroscope, a tilt sensor, etc.), and/or a motion sensor (e.g., a gyroscope, an accelerometer, an inclinometer, etc.). The input sensor can also include a manual user input device (e.g., a touch-screen display, buttons, etc.).

In a particular embodiment, the input sensor generates output indicative of the orientation of the display, and the controller is configured to automatically adjust the orientation of images displayed on the display based at least in part on the output of the input sensor. In addition, the controller responsive to signals from the input sensor can provide control instructions to the external device, whereby a user can control the external device via the headphone system. The control instructions can include, but are not limited to, audio instructions (e.g., volume up, volume down, next selection, etc.). The headphone system can also include a location determining device (e.g., a GPS device), and the controller can use signals from the GPS device to perform location based operations.

A method for manufacturing headphones is also disclosed. An example method includes providing a frame having a first region, a second region, and an intermediate region. The method also includes coupling a first speaker assembly to the first region of the frame and coupling a second speaker assembly to the second region of the frame. The method continues by assembling a user interface, memory, a display and a controller into a display unit and coupling the display unit to the frame.

A headphone system according to another embodiment of the invention includes a frame, a first speaker assembly, a transparent display, a user interface operative to receive input from a user, memory for storing data and code, and a controller. The frame has a first region, a second region, and a headband extending between the first region and the second region, where the first and second regions are configured to be positioned near first and second ears of the user, respectively. Additionally, the first speaker assembly is coupled to the first region of the frame, and the frame is configured to position the first speaker assembly near the first ear of the user. The transparent display is also coupled to the frame and is configured to be positioned in an optical path of the user when the first and the second regions of the frame are positioned near the first and second ears of the user. The controller is also coupled to the frame and, responsive to the user input, is operative to execute the code and display images on the transparent display for viewing based at least in part on the input from the user. Optionally, the transparent display can include a nose rest and/or can be sized to be viewable by both eyes of the user simultaneously.

In a particular embodiment, the transparent display is rotatably coupled to the frame and is configured to rotate between at least a first position and a second position. The transparent display is disposed in the optical path of the user when in the first position and is disposed over the headband when in the second position. Optionally, the transparent display is further configured to rotate from the second position to a third position where the transparent display is configured to be disposed around a rear region of a head of the user.

Various exemplary particular embodiments are disclosed. For example, the user interface can also include at least one sensor. The sensor can comprise one or more of a motion sensor, a sound sensor, a brainwave sensor, an orientation sensor, a global positioning system (GPS) sensor, etc. As another example, the headphone system can further include a second speaker assembly coupled to the second region of the frame, where the frame is configured to position the second speaker assembly near the second ear of the user. As yet another example, the headphone system can further include a physical connection interface, whereby the transparent display is detachable from the headphone system via the physical connection interface.

In still another particular embodiment, the headphone system further includes a network interface, and the controller is operative to display images on the transparent display based at least in part on data received via the network interface. In some embodiments, the network interface comprises a wide area network (WAN), and in other embodiments, the network interface comprise a local area network (LAN).

In yet another particular embodiment, the headphone system includes a battery and an energy harvesting device that is adapted to charge the battery. The energy harvesting device can include, for example, a solar panel, a kinetic energy harvesting mechanism operative to generate a charge responsive to movement of the headphone system, etc.

In still another particular embodiment, the optical properties of the transparent display are adjustable. Where the headphone system includes a camera coupled to the frame, the controller can be configured to adjust the optical properties of the transparent display responsive to ambient light conditions detected by the camera.

Embodiments of the headphone system can also include at least one adapter having a first portion configured to selectively couple with the frame and a second portion configured to selectively couple with an adapter-enabled device. Various adapter-enabled devices can be used, but in one embodiment, the transparent display itself is an adapter-enabled device.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a headphone system having an interactive display system. In the following description, numerous specific details are set forth (e.g., type of display screen, display contents, particular sensor types, etc.) in order to provide a thorough understanding of the invention. Those skilled in the art will recognize, however, that the invention may be practiced apart from these specific details. In other instances, details of well-known headphone manufacturing and electronic device assembly practices have been omitted, so as not to unnecessarily obscure the present invention.

Figure 1:
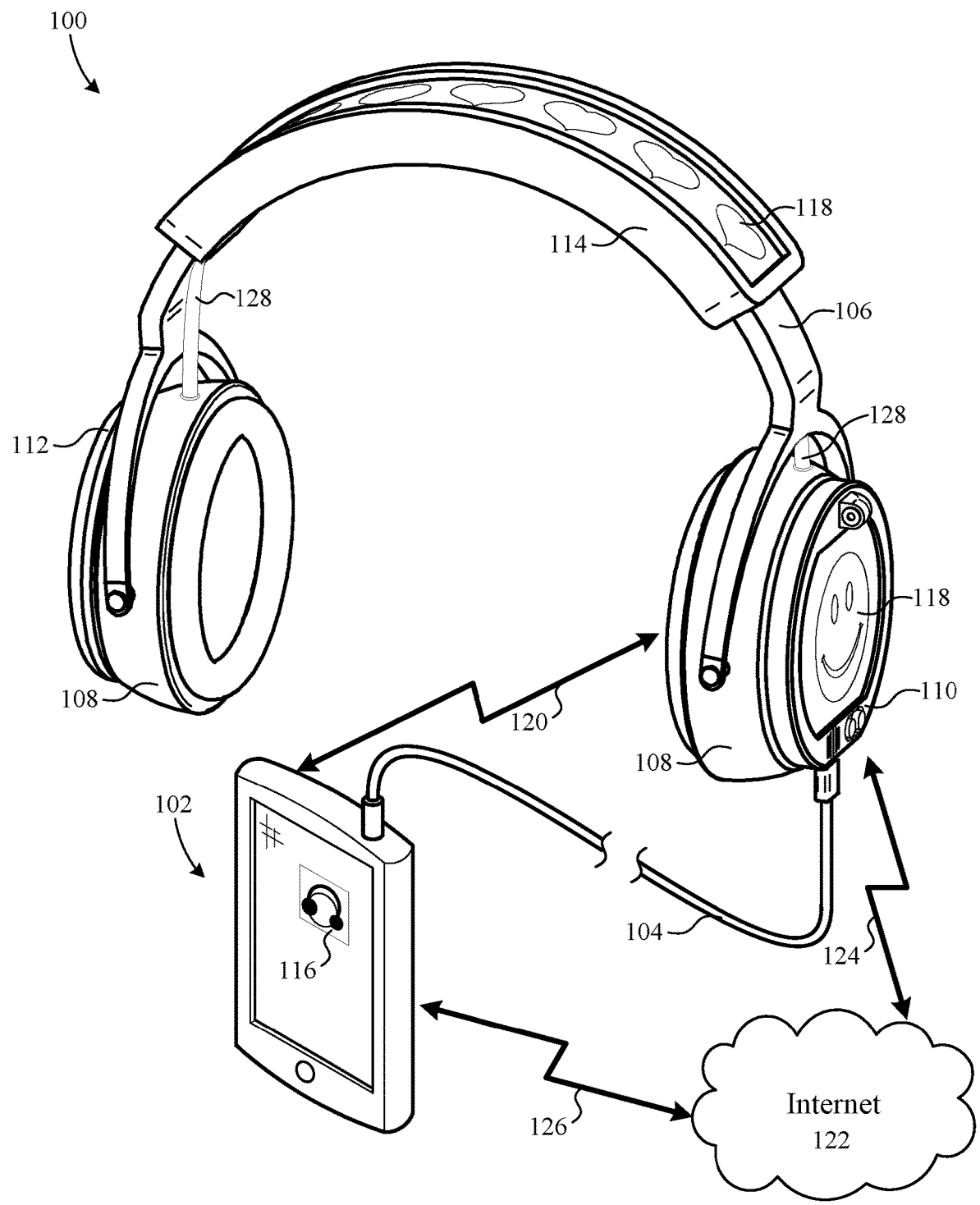
FIG. 1 is a perspective view of a headphone system connected to an external device via a data cable.

FIG. 1 is a perspective view of a headphone system 100 connected to an external device 102 via a wire 104. Headphone system 100 includes a frame 106 that supports a set of speaker assemblies 108 and an interactive visual display system which, in the example embodiment, includes a first display unit 110, a second display unit 112, and a third display unit 114. In this example, display units 110 and 112 are removable from headphone system 100 such that they can be interchanged with other display units that are universally adapted to mount on headphone system 100. Unlike units 110 and 112, unit 114 is a non-removable part of headphone system 100 in this embodiment. However, any of units 110, 112, and/or 114 can be interchangeable or integral parts of headphone system 100 without departing from the main scope of the present invention.

External device 102 is, for example, a smart phone equipped with an application 116 that enables a user to control and interact with headphone system 100. For example, visual contents 118 displayed by units 110, 112, and 114 can be controlled and interacted with in real-time via user I/O devices (e.g., touchscreen, trackball, orientation sensor, microphone, acceleration sensor, etc.) and/or other devices (e.g., GPS location determining system) of external device 102 when application 116 is operating. With application 116 operating, the audio contents output from speaker assemblies 108 can also be controlled and interacted with in real-time via user I/O devices of external device 102. Additionally, audio and display content can be preloaded into one or more of units 110, 112, and/or, 114 from external device 102 using application 116.

Wire 104 is, for example, a universal serial bus (USB) that provides a wired link through which data is communicated between headphone system 100 and an external device (i.e. external device 102). Optionally, a conventional auxiliary audio type cable could be used in place of wire 104.

Headphone system 100 is also adapted for short-range or long-range wireless communication with external devices that have wireless communication capabilities. For example, headphone system 100 is adapted to communicate with external device 102 via a short-range wireless link 120. As another example, headphone system 100 can be configured to communicate with external device 102 via a 3G/4G wireless connection, which is not short-range. As yet another example, headphone system 100 is adapted to communicate over the internet 122 via a wireless link 124. Likewise, external device 102 is also adapted to communicate over the internet 122 via a wireless communication link 126.

Display unit 110 provides control signals to display units 112 and 114 via a control cable/bus 128. Optionally, display units 110, 112, and 114 can communicate wirelessly.

Figure 2:
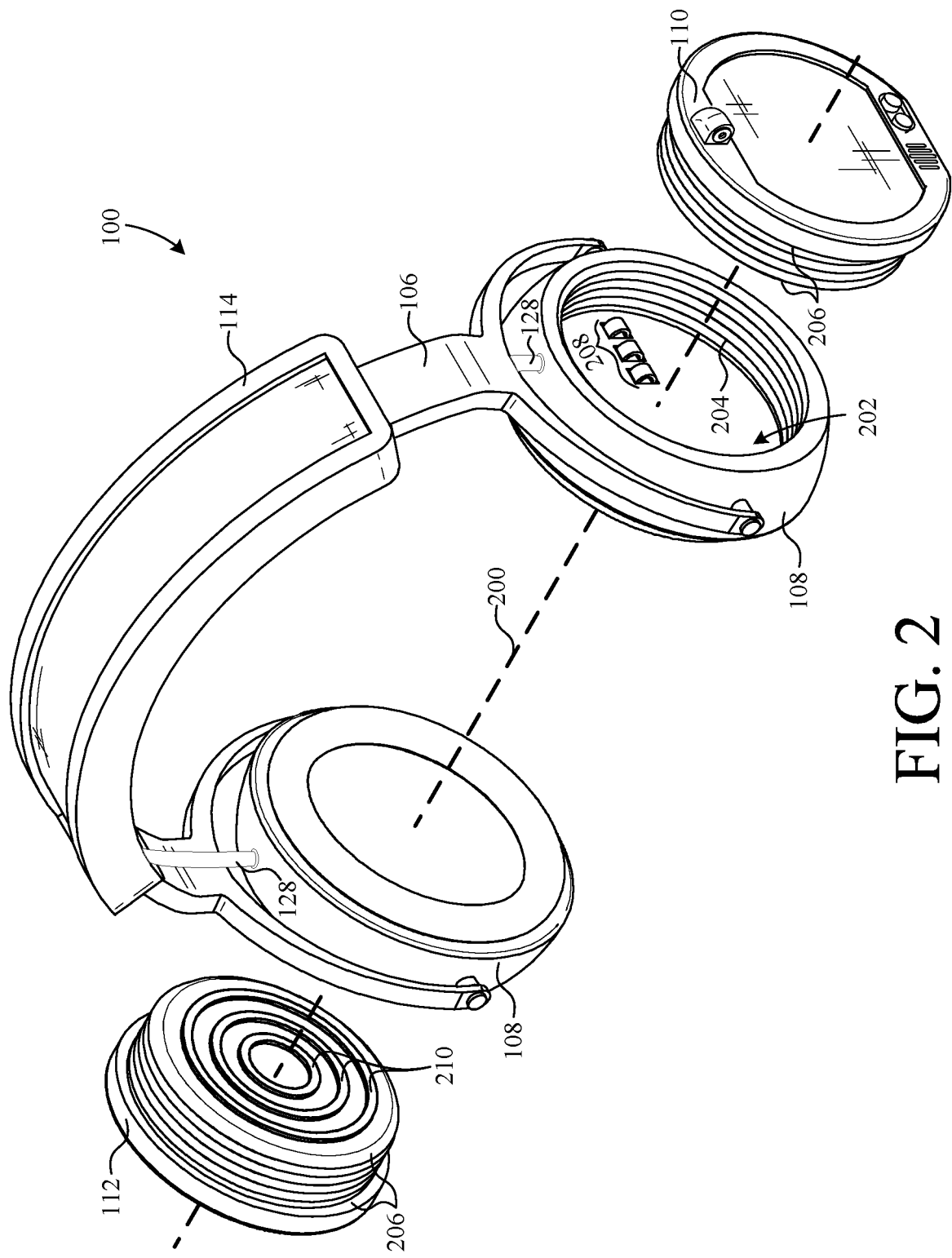
FIG. 2 is an exploded perspective view of the headphone system of FIG. 1.

FIG. 2 shows a perspective view of units 110 and 112 exploded from headphone system 100 along an axis 200. Each of speaker assemblies 108 defines a recess 202 that is adapted to receive a respective one of units 110 and 112. Furthermore, each recess 202 defines a set of internal threads 204 and a set of electrical contacts 208. Internal threads 204 are adapted to mate with a respective complementary set of external threads 206 formed on units 110 and 112. Electrical contacts 208 include, for example, three (or more) conductive spring elements formed in each of recesses 202. Each set of contacts 208 are adapted to slidably engage a complementary set of three concentric annular (or arc-shaped) electrical contacts 210 formed on the bottom side of units 110 and 112. When units 110 and 112 are threaded into recesses 202, each of contacts 210 slidably engage a respective one of contacts 208 thus establishing an electrical connection therebetween. When compressed, the spring characteristics of contacts 208 not only help to establish an electrical connection with contacts 210 but also provide a biasing force that secures units 110 and 112 into recesses 202. It should be recognized that as long as units 110 and 112 are threaded far enough into recesses 202, contacts 208 and 210 remain in contact with one another regardless of the orientation of units 110 and 112 about axis 200.

Figure 3:
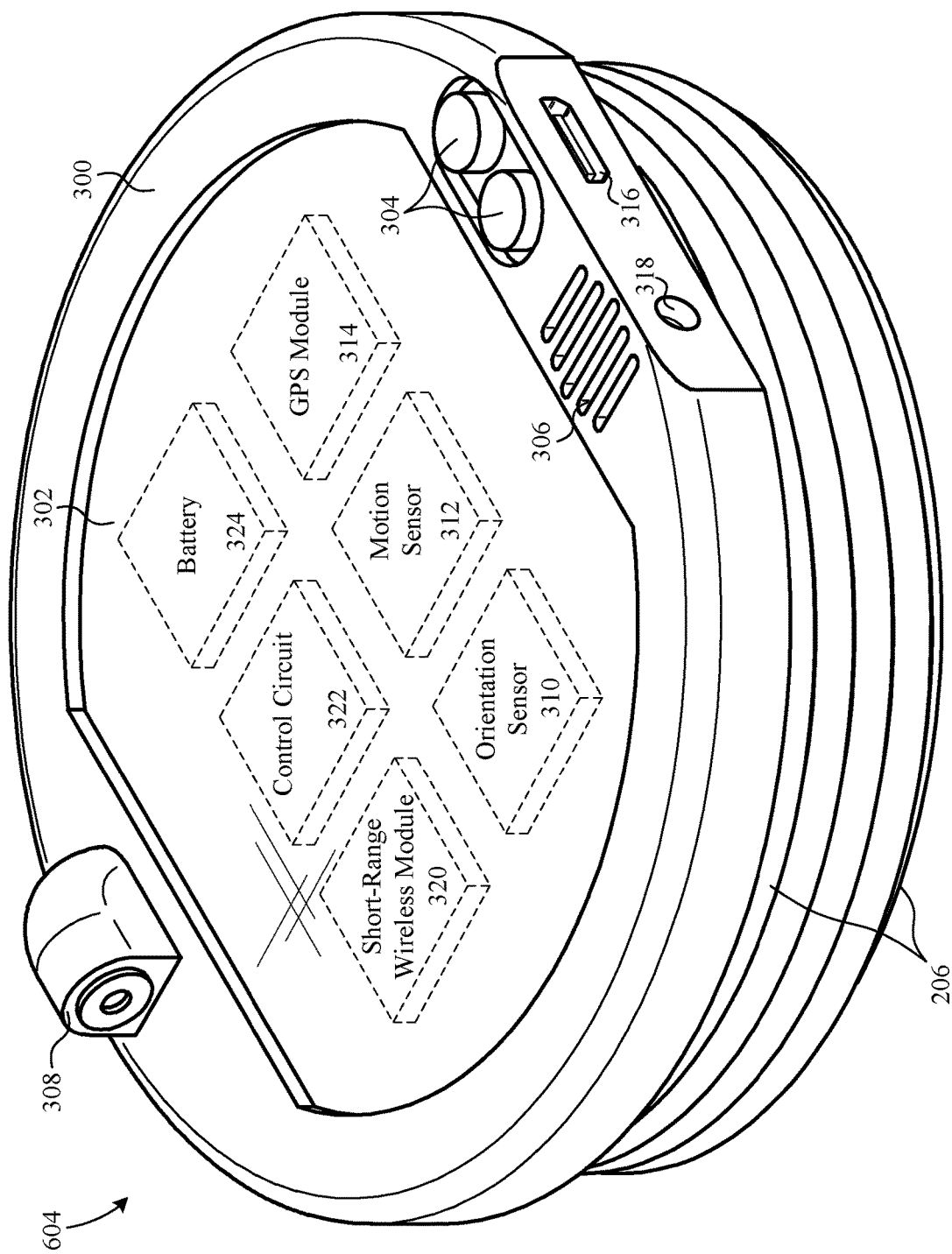
FIG. 3 is a perspective view of a display unit of the headphone system of FIG. 1.

FIG. 3 shows a perspective view of unit 110 according to one embodiment of the present invention. In addition to thread set 206 and contacts 210 (shown in FIG. 2), unit 110 further includes a housing 300 that supports a display screen 302, a set of user input buttons 304, a microphone 306, camera 308, an orientation sensor 310, a motion sensor 312, a global positioning system (GPS) module 314, a universal serial bus (USB) port 316, an auxiliary cable port 318, a short-range wireless module 320, a control circuit 322, and a battery 324.

In the example embodiment, display screen 302 is a touchscreen display screen operative to display visual contents in the form of both still images and/or video. Display screen 302 is further operative to receive user inputs via touch instructions. The contents displayed by display screen 302 can be predetermined content (e.g., music video, picture, etc.) and/or content generated in real-time via touch instructions. An example of content generated in real-time is drawing a line on display screen 302 by running a fingertip across display screen 302. Display screen 302 provides one optional means for inputting user control instructions to headphone system 100. For example, the volume of the audio signal output from speaker assemblies 108 could be adjusted by running a fingertip from the lower portion of display screen 302 toward the top of display screen 302. As another optional feature, display screen 302 can function as an additional user input device of external device 102. For example, a user could turn down the volume of external device 102 via touch instructions input through display screen 302.

User input buttons 304 are mechanical devices for inputting user control commands directly into headphone system 100. Optionally, user input buttons 304 can function as an additional user input device for inputting user control commands indirectly into external device 102. For example, buttons 304 can be used to pause an audio signal streaming from external device 102 to headphone system 100.

Microphone 306 is another input device for inputting user control commands directly into headphone system 100. In other words, microphone 306 enables a user to control unit 110 via voice/sound commands. For example, a user could instruct unit 110 to display an image of the artist of the song being played from speaker assemblies 108 by saying "display artist". As another example, a user could instruct camera 308 to capture a video by saying "record video". Similarly, microphone 306 can function as an additional user input device for inputting user control commands indirectly into external device 102. For example, a user could change the audio track being streamed from external device 102 by saying "next track". Microphone 306 can also be used by unit 110 to record sound or it can be an additional microphone from which external device 102 can record sound.

Camera 308 enables unit 110 to record digital video and/or still images. The user control of camera 308 can be done directly through input devices of unit 110 (i.e., display screen 302, buttons 304, microphone 306, orientation sensor 310, motion sensor 312). Optionally, the operation of camera 308 can be from external device 102.

Orientation sensor 310 is, for example, a microelectromechanical system (MEMS) gyroscope. Orientation sensor 310 provides several useful features to headphone system 100. For example, orientation sensor 310 allows unit 110 to detect its orientation so that it can adjust the orientation at which content is displayed from display screen 302. Another useful feature is that orientation sensor 310 operates as a user input device for controlling headset 100. For example, a user can raise and lower the audio volume of headphone system 100 by tilting their head in a first direction and an opposite second direction, respectively. As another example, a user can change the content displayed from display screen 302 by changing the orientation of their head. Another useful feature is that orientation sensor 310 operates as a user input device for controlling external device 102. For example, a user can adjust the ringer volume of external device 102 by changing the orientation of headphone system 100.

Motion sensor 312 is, for example, an accelerometer that provides several useful features to headphone system 100. One feature is that sensor 312 operates as a user input device for controlling headphone system 100. For example, a user can raise the audio volume of headphone system 100 by rapidly turning their head in a first direction and lower the volume by rapidly turning their head in the opposite second direction. The magnitude at which the volume changes can be proportional to the acceleration at which the user moves their head. A user can change and/or alter the content displayed from display screen 302 by moving their head. For example, a ball displayed by display screen 302 can appear to bounce off the peripheral edges of display screen 302 as a user shakes their head. Another useful feature is that motion sensor 312 operates as a user input device for controlling external device 102. For example, a user can choose to answer an incoming call to external device 102 by nodding their head in some predetermined fashion.

GPS module 314 is a conventional GPS module that enables headphone system 100 to carry out location sensitive functions. For example, GPS information supplied by a sensor in module 314 facilitates the output of location sensitive image, video, and audio contents. As another example, interactive headphone system 100 can play audio or display video/image information related to major events happening currently in the present location. As yet another example, interactive headphone system 100 can play/display information related to discounts or promotions in the vicinity, traffic information, severe weather information, etc., by interacting with authorized sources via the Internet.

In this particular embodiment, there are three optional external device interfaces through which headphone system 100 can communicate with an external device (i.e. external device 102), namely USB port 316, auxiliary cable port 318, and short-range wireless module 320. USB port 316 is adapted to receive a data cable (i.e. wire 104) through which data can be preloaded onto unit 110 or streamed in real-time. For example, media files (e.g., mp3 audio files, video files, image files, etc.) can be preloaded onto unit 110 from a computer (i.e. external device 102) through USB port 316. Optionally, USB port 316 can be a data port (e.g. HDMI port) through which media files can be streamed to unit 110 in real-time. Not only can USB port 316 facilitate data exchange between unit 110 and an external device, but it can also be used to supply power to unit 110. The power supplied to unit 110 can be used to charge battery 324 and/or to supply unit 110 with direct operating power. Auxiliary cable port 318 is adapted to receive an auxiliary audio cable through which audio data is streamed to unit 110 from an external audio signal source (e.g. mp3 player). Short-range wireless module 320 provides a wireless link through which wireless data can be preloaded onto unit 110 and/or streamed in real-time. For example, media files can be preloaded onto unit 110 from a computer (i.e. external device 102) via short-range wireless module 320. Optionally, media files can be streamed to unit 110 in real-time from a computer via short-range wireless module 320.

Control circuit 322 provides overall coordination and control of the various functions of unit 110. Control circuit 322 is electrically coupled to display screen 302, buttons 304, microphone 306, camera 308, orientation sensor 310, motion sensor 312, GPS module 314, USB port 316, auxiliary cable port 318, short-range wireless module 320, and battery 324.

Figure 4:
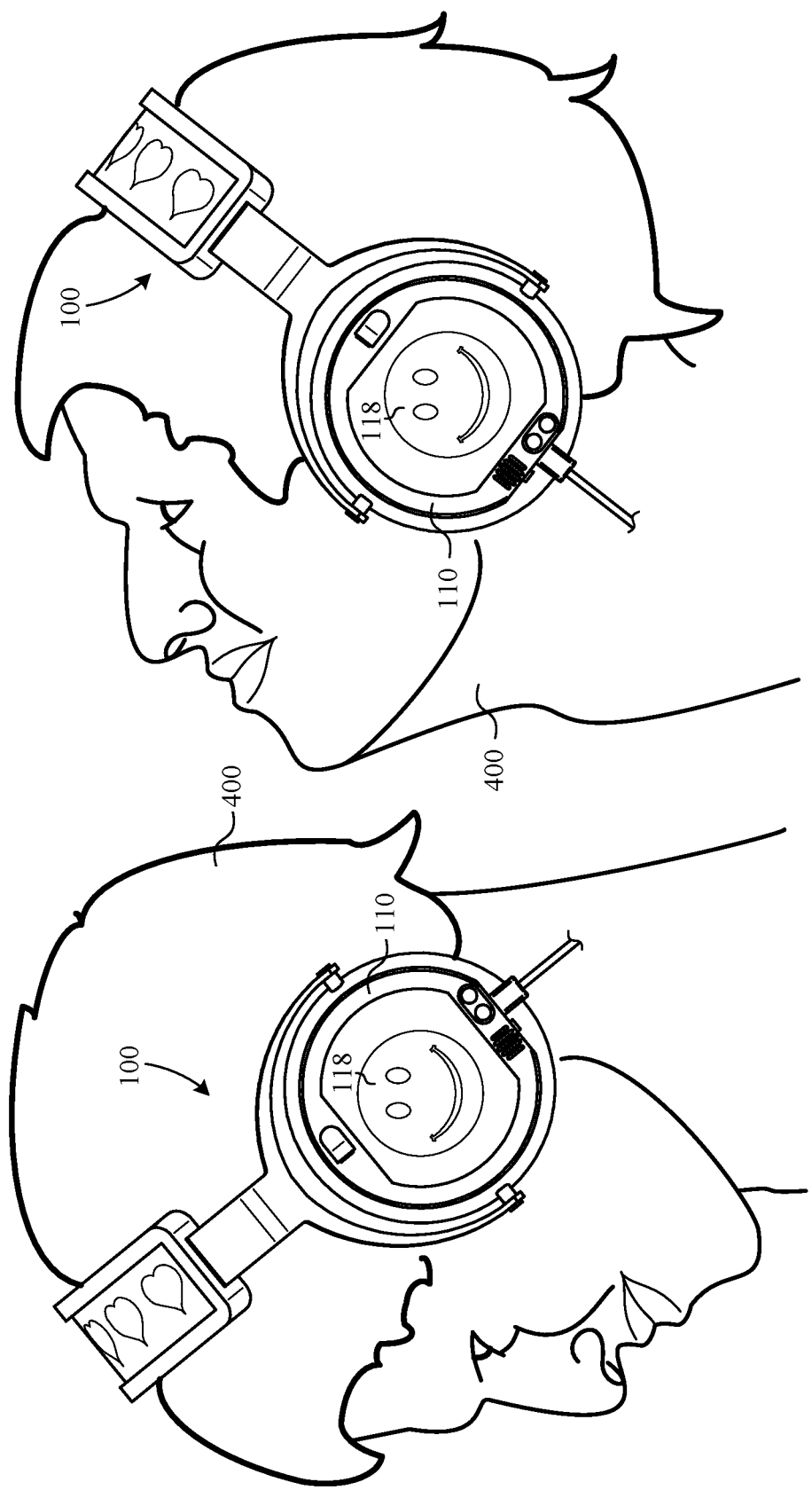
FIG. 4 is an illustration of the headphone system of FIG. 1 being worn by a user.

FIG. 4 illustrates an orientation correction feature of headphone system 100 by depicting display content 118 when a user 400 is looking down and looking up. As shown, the orientation of display content 118 remains correct regardless of the orientation of unit 110. As previously mentioned, orientation correction is facilitated by orientation sensor 310 (shown in FIG. 3). This particular feature is not only useful when the orientation of headphone system 100 is changed but also when the orientation of unit 110 is changed with respect to the rest of headphone system 100. For example, if unit 110 is partially unscrewed (e.g., 90 degrees) from recess 202, orientation sensor 310 will detect the orientation offset and the orientation of content 118 will be corrected.

Figure 5:
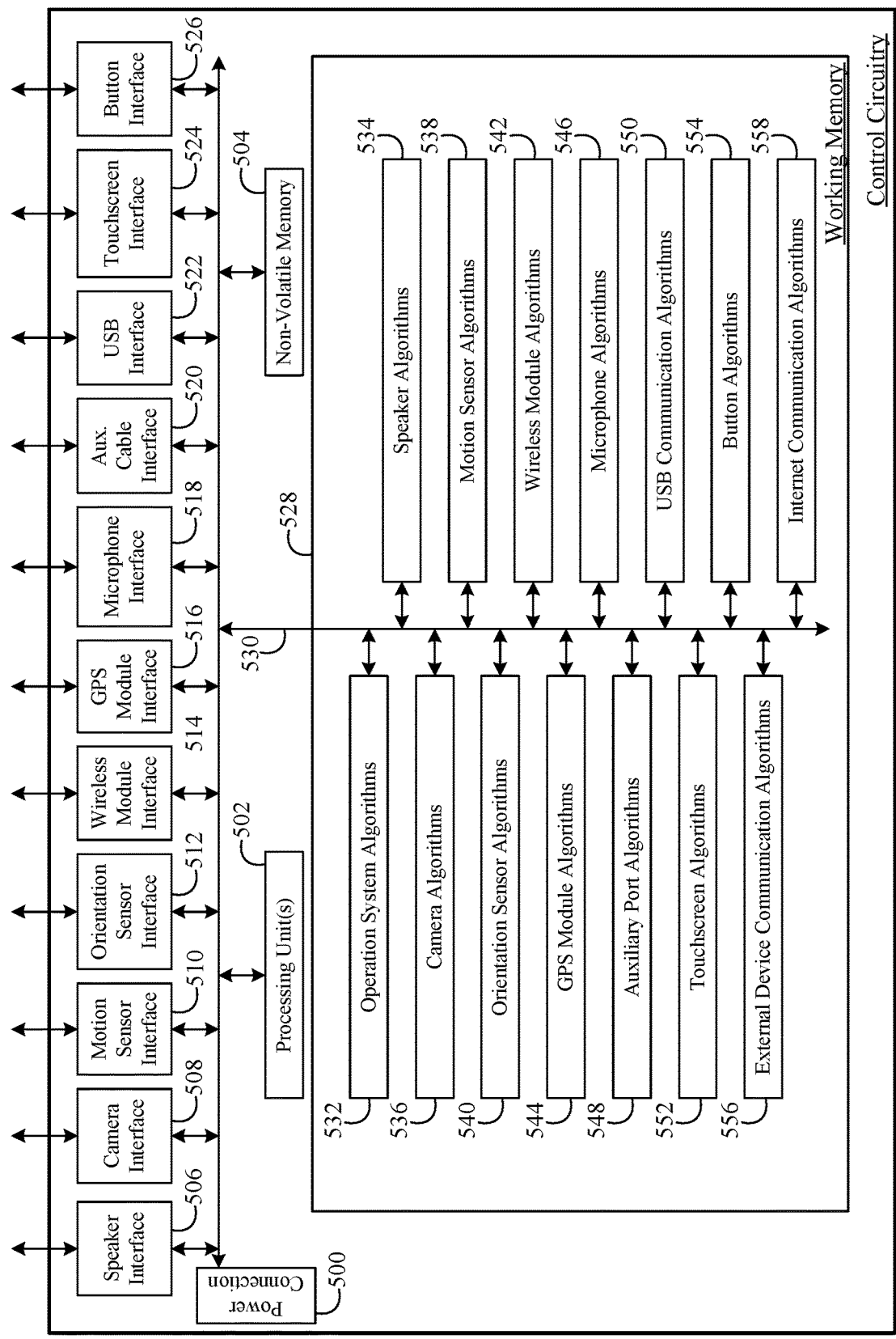
FIG. 5 is a block diagram of the control circuit of FIG. 3.

FIG. 5 is a block diagram of control circuit 322 according to one embodiment of the present invention. Control circuit 322 includes a power connection 500, one or more processing units 502, non-volatile memory 504, a speaker interface 506, a camera interface 508, a motion sensor interface 510, an orientation sensor interface 512, a wireless module interface 514, a GPS module interface 516, a microphone interface 518, an auxiliary cable interface 520, a USB cable interface 522, a touchscreen interface 524, a button interface 526, and a working memory 528 all interconnected via a system bus 530. Power connection 500 provides a means for electrically connecting control circuit 322 to battery 324 or some other source of operating power. Processing unit(s) 502 execute(s) data and code stored in working memory 528, causing headphone system 100 to carry out its various functions. Non-volatile memory 504 (e.g., read-only memory) provides storage for data and code (e.g., boot code and programs, digital audio files, image/video files, etc.) that are retained even when headphone system 100 is powered down. Speaker interface 506 provides a connection between unit 110 and the speakers of speaker assemblies 108. Camera interface 508 facilitates the electrical connection of camera 308 to control circuit 322. Motion sensor interface 510 facilitates the electrical connection of motion sensor 312 to control circuit 322. Orientation sensor interface 512 facilitates the electrical connection of orientation sensor 310 to control circuit 322. Wireless module interface 514 facilitates the electrical connection of short-range wireless module 320 to control circuit 322. GPS module interface 516 facilitates the electrical connection of GPS module 314 to control circuit 322. Microphone interface 518 facilitates the electrical connection of microphone 306 to control circuit 322. Auxiliary cable interface 520 facilitates the electrical connection of external devices (e.g. external device 102) to control circuit 322 indirectly through auxiliary cable port 318. USB interface 522 facilitates the electrical connection of external devices (e.g. external device 102) to control circuit 322 indirectly through USB port 316. Touchscreen interface 524 facilitates the electrical connection of display screen 302 to control circuit 322. Button interface 526 facilitates the electrical connection between buttons 304 and control circuit 322.

Working memory 528 (e.g., random access memory) provides temporary storage for data and executable code, which is loaded into working memory 528 during start-up and operation. Working memory 528 includes operating system algorithms module 532, speaker algorithms module 534, camera algorithms module 536, motion sensor algorithms module 538, orientation sensor algorithms module 540, wireless algorithms module 542, GPS algorithms module 544, microphone algorithms module 546, auxiliary port algorithms module 548, USB communication algorithms module 550, touchscreen algorithms module 552, button algorithm module 554, external device communication algorithms module 556, and an internet communication algorithms module 558.

The modules of working memory 528 provide the following functions. Operating system algorithms module 532 provides coordination and control of the various running programs and modules of headphone system 100. Speaker algorithms module 534 facilitates the output of analog audio signals from speaker interface 506 to speakers of speaker assemblies 108. Camera algorithms module 536 facilitates the operation (e.g., shutter operations, image processing/storage, etc.) of camera 308. Motion sensor algorithms module 538 carries out various operations according to motion measurement signals captured by motion sensor 312. For example, motion sensor algorithms module 538 can output instructions to reduce the audio volume of headphone system 100 when motion sensor 312 measures some predetermined acceleration. Orientation sensor algorithms module 540 carries out various operations according to the orientation measured by orientation sensor 310. For example, orientation sensor algorithms module 540 can include an algorithm that outputs instructions to correct the orientation of contents displayed by display screen 302 when orientation sensor 310 senses that the orientation of unit 110 has been changed. Wireless algorithms module 542 facilitates wireless communication between headphone system 100 and wireless enabled devices such as, for example, external device 102, a wireless modem, etc. GPS algorithms module 544 facilitates the operation of and use of data from GPS module 314. Microphone algorithms module 546 performs operations based on audio signals measured/captured by microphone 306. For example, module 546 can include an algorithm that pauses the audio output from headphone system 100 in response to the word "Pause" being spoken into microphone 306. Auxiliary port algorithms module 548 facilitates communication between system 100 and external system 102 via a wire plugged into auxiliary cable port 318. USB communication algorithms module 550 facilitates communication between headphone system 100 and external system 102 via a wire (i.e. wire 104) plugged into USB port 316. Touchscreen algorithms module 552 facilitates the operation of display screen 302. Button algorithm module 554 is operative to carry out functions according to user instructions input to buttons 304. External device communication algorithms module 556 facilitates communication between headphone system 100 and external devices such as, for example, external device 102. Internet communication algorithms module 558 facilitates the connection of headphone system 100 to the internet.

Figure 6:
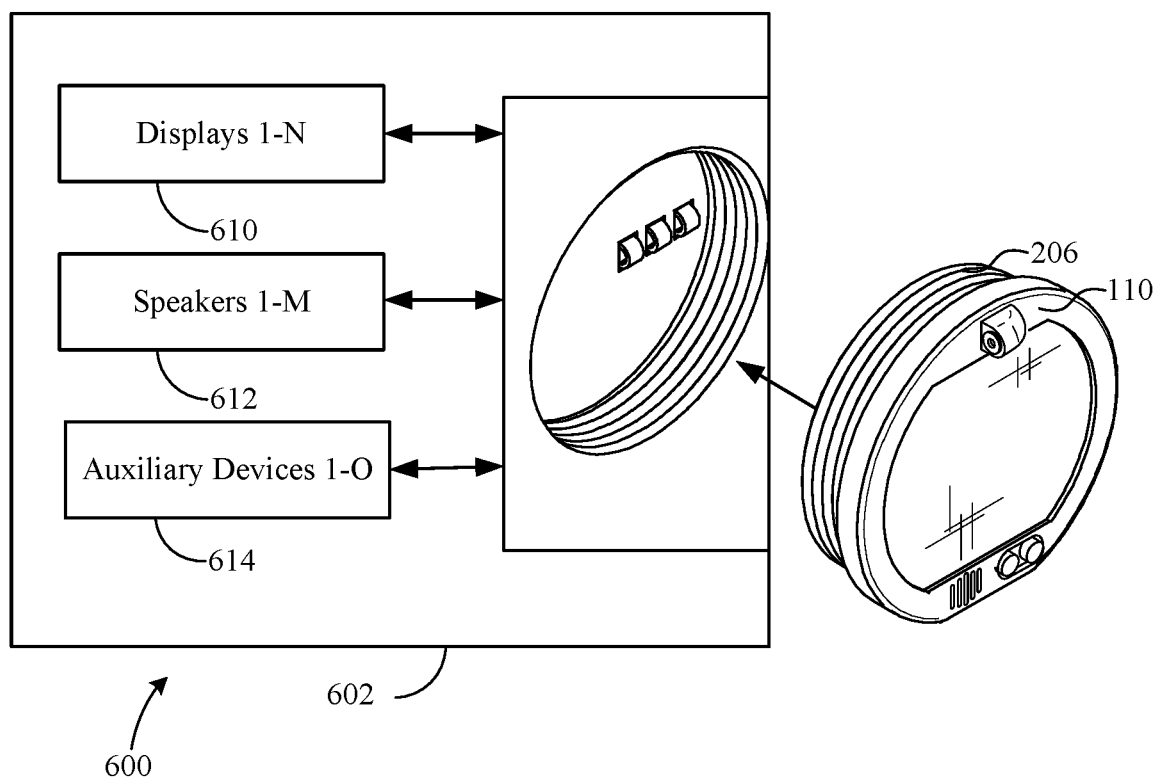
FIG. 6 is a representational image of an alternate assembly adapted to receive the display unit of FIG. 2.

FIG. 6 is a representational image of an alternate system 600, including display unit 110 and an alternate assembly 602 adapted to receive display unit 110. Example embodiments of alternate assembly 602 include, but are not limited to, a belt buckle, a carry bag, waist wear, a cap/hat, a jacket, other clothing, and other non-headphone systems. Similar to headphone system 100, alternate assembly 602 includes a set of displays 610, a set of speakers 612, and a set of auxiliary devices 614.

Figure 7:
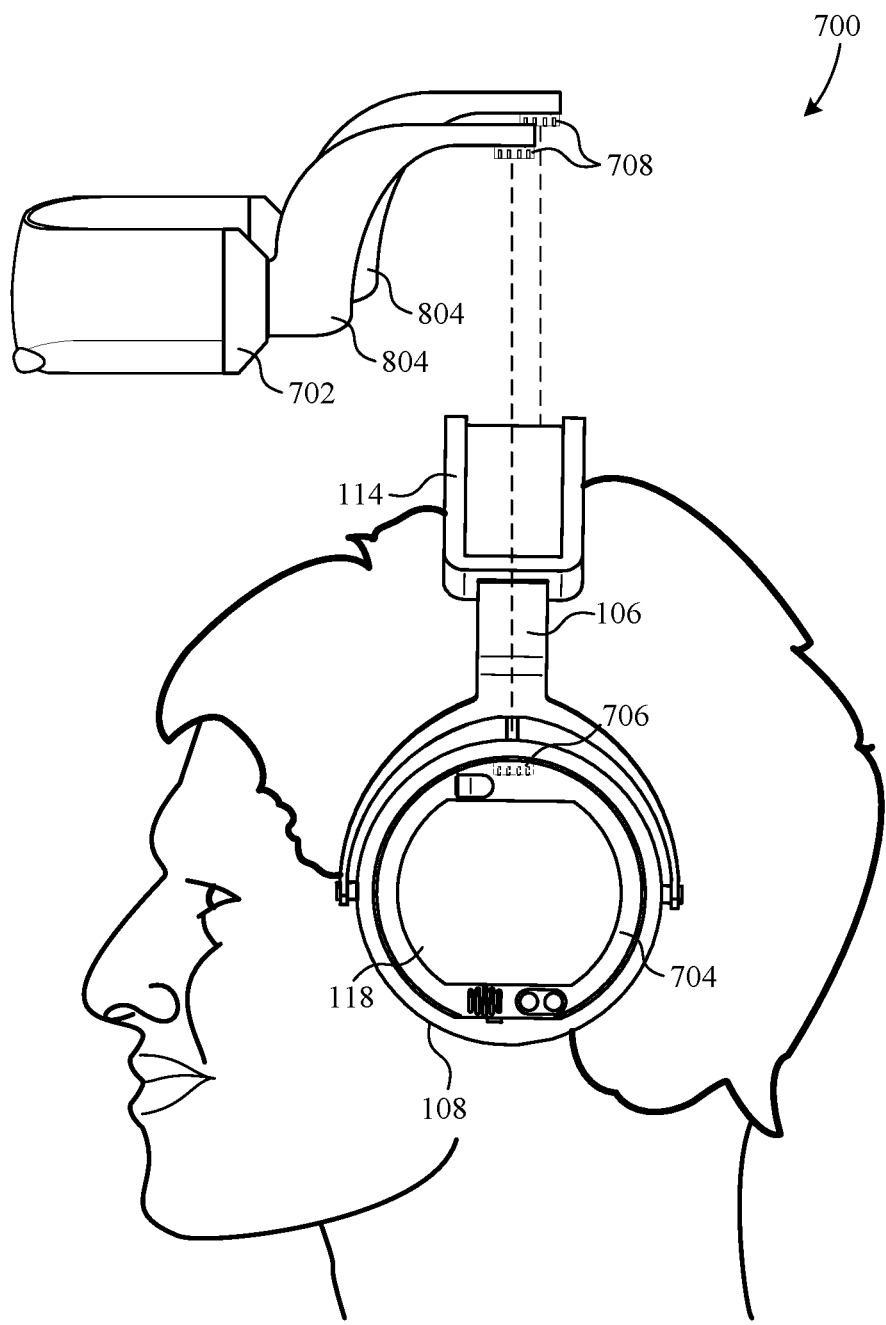
FIG. 7 is a side view of a headphone system including a transparent display according to one embodiment of the invention.

FIG. 7 shows a side view of a headphone system 700 according to another embodiment of the present invention. Headphone system 700 is similar to headphone system 100, except that headphone system 700 includes a detachable transparent display 702 that is configured to couple to a display unit 704 near the user's left ear and an opposite display unit (not shown) near the user's right ear. Display unit 704 is similar to display unit 110 but is further adapted to receive and operate transparent display 702 via a physical connection interface 706, which is, for example, an electromechanical port. The opposite display unit is also coupled to frame 106 and includes a connection interface 706, but is otherwise similar to display unit 112 (FIG. 1). The opposite display unit can also include some or all of the components of display unit 704 as desired. Transparent display 702 includes a plurality of connection interfaces 708, each of which comprises an electromechanical plug that is adapted to connect to an interface 706 of the associated display unit 704 and opposite display unit. Note that the features of headphone system 700 and display unit 704 that are the same as those of headphone system 100 and display unit 110, respectively, are denoted by like reference numbers and withheld from the description to avoid redundancy.

Figure 8:
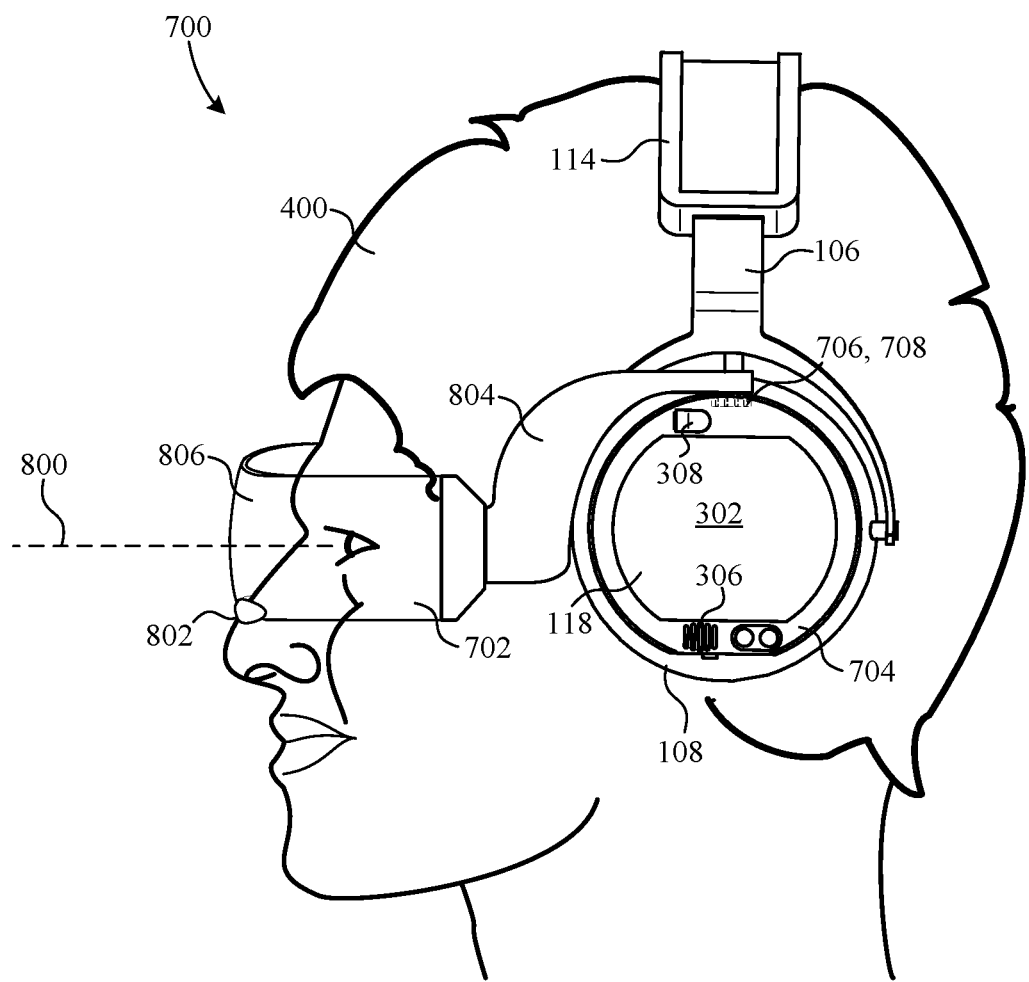
FIG. 8 is a side view showing the transparent display of FIG. 7 connected to the headphone system of FIG. 7.

FIG. 8 shows a side view of headphone system 700, including transparent display 702, being worn by user 400. Accordingly, the interfaces 708 of transparent display 702 are plugged into the complementary interfaces 706 of display unit 704 and the opposite display unit and, therefore, transparent display 702 is positioned directly in the optical path 800 of user 400. In this embodiment, transparent display 702 is sized to be viewed by both eyes of user 400 simultaneously. In other embodiments, transparent display 702 can be smaller.

Transparent display 702 includes a nose rest 802, a frame 804, and a transparent display screen 806. Nose rest 802 is fixed to the bottom of transparent display 702 and is adapted to engage a user's nose to support transparent display 702 and to facilitate the positioning of transparent display 702 with respect to the user's eyes. Frame 804 facilitates the support and positioning of transparent display 702 with respect to display units 704. Frame 804 also includes internal circuitry (not shown), which carries electrical power and display driving signals (e.g., data, control signals, etc.) between display screen 806 and the control circuitry of display unit 704 and/or the opposite display unit.

While each side (bow) of frame 804 includes an interface 708 (see FIG. 7), in other embodiments transparent display 702 can have only one interface 708, for example, on the side of frame 804 that connects with display unit 704. In such a case, the other side of frame 804 can be eliminated or have a connector adapted only to engage an associated interface 706 for physical support purposes. Indeed, many interface and transparent display designs are possible and such modifications are within the scope of the invention.

Display unit 704 and the opposite display unit can also be in communication with each other (e.g., via bus 128, shortwave wireless, etc.) and cooperate to operate transparent display 702. For example, display unit 704 and/or the opposite display unit can provide one or more of power, data, and/or control signals to respective interfaces 708 of transparent display 702. In other embodiments, display unit 704 can control the operation of transparent display 702 alone. In still other embodiments, the display unit 704 and opposite display unit can operate in a master and slave configuration, such that one display unit has primary control of transparent display 702 while the other display unit has secondary control, for example, responsive to a request by the master or user, on a fail-over basis, to add processing power, etc.

While transparent display 702 is positioned in the optical path of user 400 in FIG. 8, it should be noted that rotating display unit 704 and the opposite display unit with respect to frame 106 will also cause transparent display 702 to rotate with respect the user's head. As mentioned above, each set of electrical contacts 208 provides a resilient connection, whereby a display unit can be rotated but still remain in electrical contact with the contacts 208.

Display screen 806 is, for example, a transparent LCD or LED display that allows the user 400 to see through it while superimposing useful images thereon. When the power is off, display screen 806 is transparent. However, display screen 806 can also be powered and driven with images based on the needs of the user and associated programming of display unit 704. Transparent display screens are commercially available from various manufacturers, including Planar Systems, LG, and Samsung.

Transparent display screen 806 provides several valuable features. For example, transparent display screen 806 can be operated to provide augmented reality by asserting images on transparent display screen 806 that are superimposed over the live scene viewable by user 400 beyond transparent display 702. As another example, display screen 806 can be made to correct for a user's vision deficiencies such as nearsightedness, farsightedness, and/or astigmatism. As still another example, display screen 806 can be operated in a uniform, semi-transparent mode to simulate sun glasses. More specifically, the user can control the color, pattern, and tint of display screen 806 (e.g., by controls displayed on the screen 302 of display unit 704, voice commands, body gestures, etc.). Light transparency of the screen 806 can also be adjusted automatically where input from a light sensor (e.g., camera 308) is available. Additionally, sun glasses mode can be background operated in combination with other modes.

Display screen 806 can also be operated according to information provided by the sensors of system 700. For example, display screen 806 can display images/video captured by camera(s) 308 from behind the user in real-time and/or with a 360 degree field of view, which can optionally be displayed as virtual reality views. Of course, headset system 700 and/or the display unit(s) can have multiple cameras pointing in multiple directions to facilitate these and other functions. As still another example, with the associated software accessible, system 700 can operate as a translator. For example, voice recognition software can be used to receive a conversation in one language via microphone 306, translate it to another language, and output the translated version through speaker assembly 108 with minimal delay. Similarly, display screen 806 can be operated to display images that have been translated into another language, for example, from the original language detected in a picture taken by a camera 308.

With the audio and visual detection capabilities of microphone 306 and camera 308, as well as feedback from the other available sensors (e.g., a GPS sensor), system 700 can also use artificial intelligence software (e.g., built-in applications, applications that are downloaded and installed, services available in the Internet Cloud, etc.) to function as an autonomous travel guide. In particular, system 700 can be operated to help cyclists and drivers navigate the road, avoid possible dangers, and foresee traffic congestions ahead. Such information is output to the user through transparent display 702 and/or speakers 108. Indeed, with all of the on-board sensors and output devices, system 700 can implement various virtual reality (VR) and/or augmented reality (AR) functions helpful to user 400 and, thus, serve as VR or AR goggles.

As still another example, headphone system 700 can be particularly useful in electronic commerce. More particularly, headphone system 700 can be configured to execute payment for online purchases in embodiments where headphone system 700 can communicate over the Internet. Transparent display 702 can display purchase and/or payment information for items, and headphone system 700 can be configured to facilitate purchase approvals and make payments, for example, by accepting voice commands from user 400 via microphone 306 and/or by recognizing head movements (nods, shakes, etc.) captured by one or more other sensors (e.g., accelerometers, cameras, etc.).

More generally, headphone system 700 enables user 400 to perform various actions using voice commands and head motions. For example, voice recognition software can translate the user's voice commands into actions (e.g., making a purchase, taking a picture, etc.). Similarly, the user may use body gestures detectable by the sensors of the headphones 700, such as moving his/her head sideways or up and down as a rejection or confirmation of an action, respectively.

Indeed, the functions of headphone system 700 can become complex. Therefore, as alluded to above, sometimes these complicated programs (e.g., artificial intelligence, virtual reality, etc.) will need more processing power than the processor(s) of headphone system 700 can provide. In such a case, headphone system 700 can be configured to send the desired requests and parameters collected locally to a service provider on the Internet, or to a local server in the case of a local area network. The external server can then process the request and return the result to headphone system 700. Thereafter, the headphone system 700 can act according to the received results, such as by displaying returned images to user 400 via transparent display 702. Offloading processing from headphone system 700 thus enables headphone system 700 to perform very complex functions, while keeping processing delays to a minimum.

Figure 9:
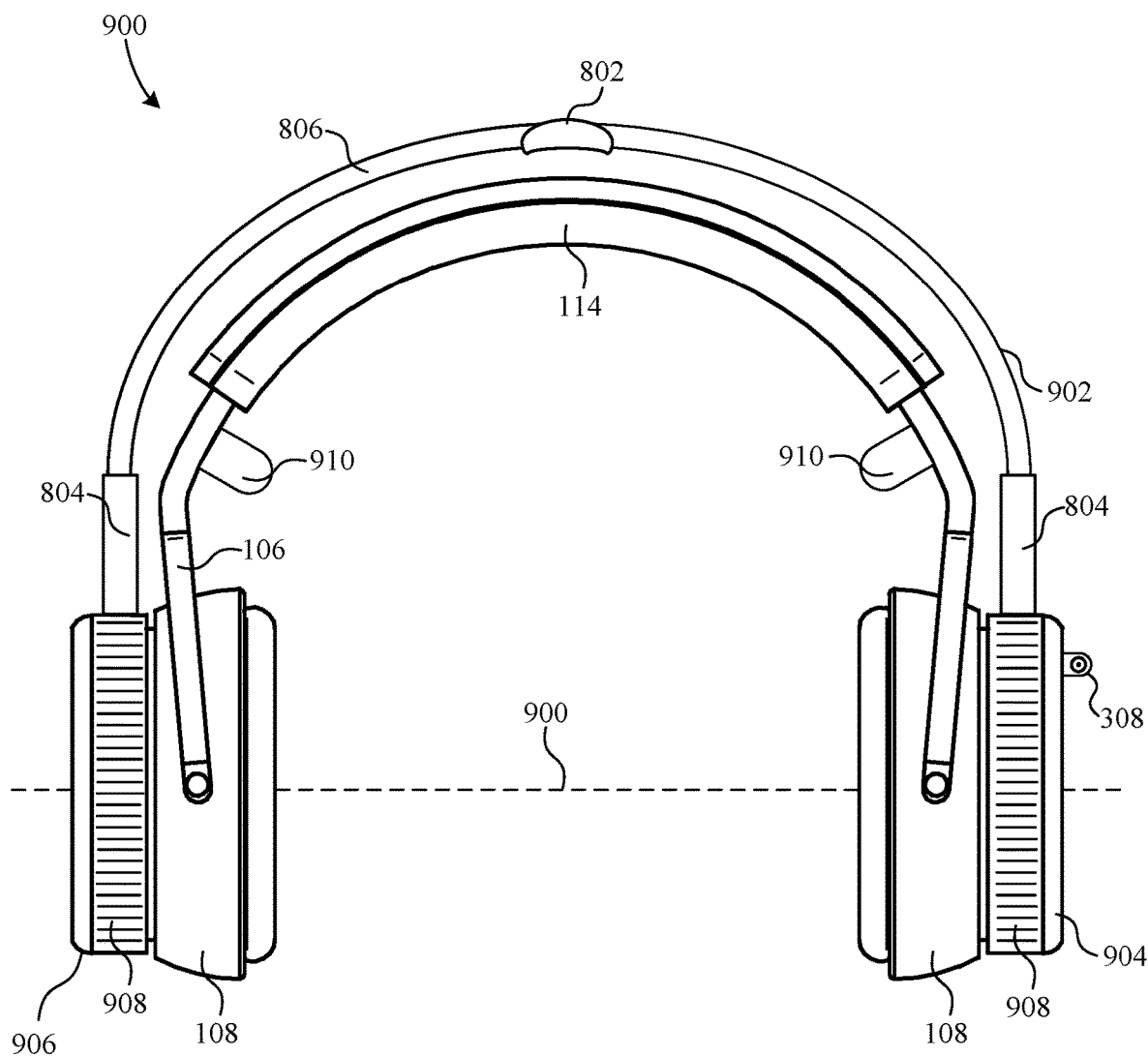
FIG. 9 is a front view of a headphone system with transparent display according to another embodiment of the invention.

FIG. 9 shows a front view of a headphone system 900 according to an alternative embodiment of the invention. Headphone system 900 is similar to headphone system 700, except that headphone system 900 includes a transparent display 902 that is coupled to a display unit 904 and opposite display unit 906 via respective rotatable ring assemblies 908. Rotatable ring assemblies 908 allow transparent display 902 to rotate about an axis 900. More specifically, rotatable ring assembly 908 allows transparent display 902 to be rotated from a front position in the optical path of user 400, to an upright position that is 90 degrees from the front position, and to a rear position which is 180 degrees from the front position. Accordingly, transparent display 902 can be rotated at least 180 degrees about axis 900. When in the rear position, the interactive display 702 can function as a billboard for people walking behind the user 900.

In the present embodiment, transparent display 902 is affixed to rotatable ring assemblies 908. However, transparent display 902 can made removable by incorporating interfaces similar to ports 706 (or other connectors) into the rotatable ring assemblies 908 of display units 904 and 906.

FIG. 9 further shows that system 900 includes a set of brain wave sensors 910 mounted on frame 106 so as to engage the head of user 400. Sensors 910 are coupled to the control circuitry of one or more of display unit(s) 904 and 906 via bus 128 (see FIGS. 1 and 3). This allows system 900 to receive user input in the form of brain activity. Responsive to particular brain activity acquired through sensors 910, headphone system 900 can carry out various tasks based on the input. In other words, the user can instruct system 900 to carry out functions simply by thinking. Although sensors 910 are intended to be in contact with the user's head, non-contact brain wave sensors can also be used to monitor brain activity. In addition to brainwave sensors 910, headphone system 900 can also be configured to include, or interface with (e.g., wirelessly, etc.), other biometric and/or behavioral sensors (e.g., heart rate sensor, blood pressure sensor, pedometer, etc.) to provide user 400 with biometric data and analysis via transparent display 902. Brainwave and biometric sensors can also be incorporated into the other headphone systems described herein. Indeed, the various sensors described herein can be used to collect various behavioral parameters, which can be analyzed and used to providing precision advertisement to user 400 via display 702, speaker assemblies 108, etc.

Figure 10:
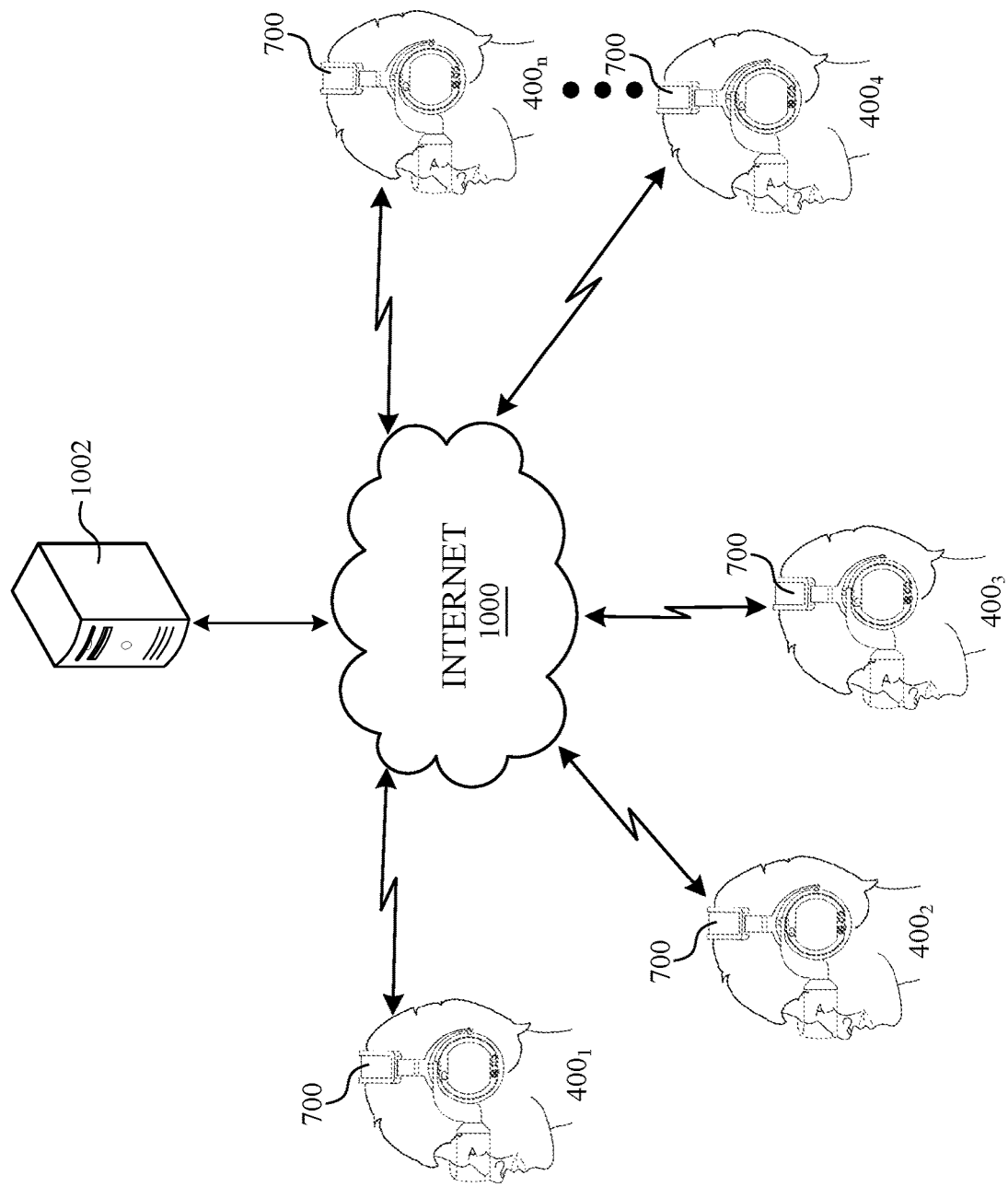
FIG. 10 is a diagram showing a plurality of the headphone systems of FIG. 7 networked with one another over an internetwork.

FIG. 10 shows a global social network of users $400_1$-$400_n$ using respective headphone systems 700 to communicate with one another via the Internet 1000 or some other wide area network. In one embodiment, headphone systems 700 can store application(s) that facilitate direct connections and communications with one another over Internet 1000.

In other embodiments, a central server 1002 hosts the global social network of users $400_1$-$400_n$ via the Internet 1000. Accordingly, central server 1002 is operative to perform various content functions, including but not limited to, receiving content from the headphone systems 700 of various users $400_1$-$400_n$, processing content, creating or augmenting content, delivering content to the headphone systems 700 of users $400_1$-$400_n$, etc. Central server 1002 can also push application(s) to headphone systems 700, so that headphone systems 700 can interface and communicate content with central server 1002 or other headphone systems 700 in accordance with the application(s). Alternatively, applications used to interface with central server 1002 can be pre-loaded in the control circuitry of headphone systems 700.

The global social network of FIG. 10 can provide a wide variety of functions and advantages. For example, once a group is formed, users $400_1$-$400_n$ can collaborate or perform interactively. Images and/or videos captured by one or more user's cameras can be viewed by other users 400. Similarly, users $400_1$-$400_n$ can also hear through their own speaker assemblies 108 what is being captured through other user's microphones 306. Users 400 can also see one another and interact via an augmented reality or virtual reality display. In addition, users 400 can share and display images they want to advertise via the displays on the sides of the display units and/or on the headbands 114 of their headphone systems 700.

One particular social networking application is a virtual global concert in which some or all of the attendants are in different parts of the world and wear headphone systems 700. Accordingly, each user 400 can listen to the same music by the disc jockey (DJ), display images/videos that are centrally supplied, and see the virtual dance floor or each individual dancer/performer via the augmented display on their transparent display 702. The global social network of systems 700 can also be used to enable an interactive virtual conference where all participants are remotely located (e.g., scattered across the globe) but can still collaborate.

Another advantage to a headphone system 700 being connected to internet 1000 is that complex computing operations can be carried out remotely from the system 700, such as by central server 1002 or other internet servers (not shown), so as not to overload the local memory and processing capabilities of system 700. In other words, each system 700 can send local processing tasks, data, and requirements to remote computer(s) on internet 1000 to do the analysis and processing and then return the desired results to system 700 for further use (e.g., display on transparent display 702).

Figure 11:
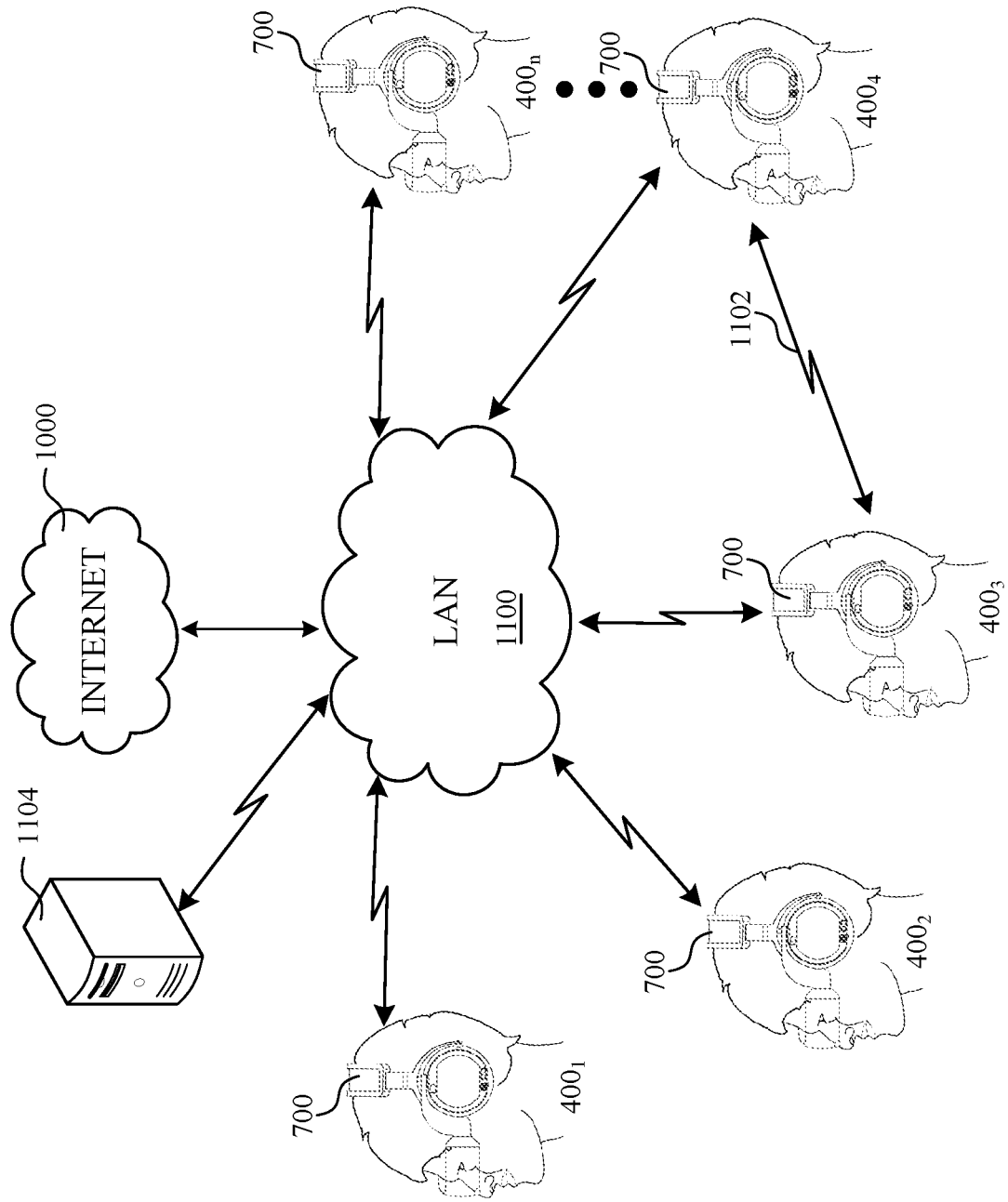
FIG. 11 is a diagram showing a plurality of the headphone systems of FIG. 7 networked with one another over a local-area network.

FIG. 11 is similar to FIG. 10, but shows a local network of users $400_1$-$400_n$ communicating with one another over a local-area network (LAN) 1100. In addition, users $400_1$-$400_n$ wearing headphone systems 700 can also communicate directly with one another via a short-range wireless signal 1102 or other peer-to-peer connection. Furthermore, LAN 1100 is connected to internet 1000 to facilitate data communication between headphone systems 700 and entities on the internet, such as central server 1002 (e.g., for processing assistance, etc.). A local server 1104 can also be coupled to LAN 1100 to facilitate local application hosting (e.g., collaboration programs, etc.) for users $400_1$-$400_n$.

Figure 12:
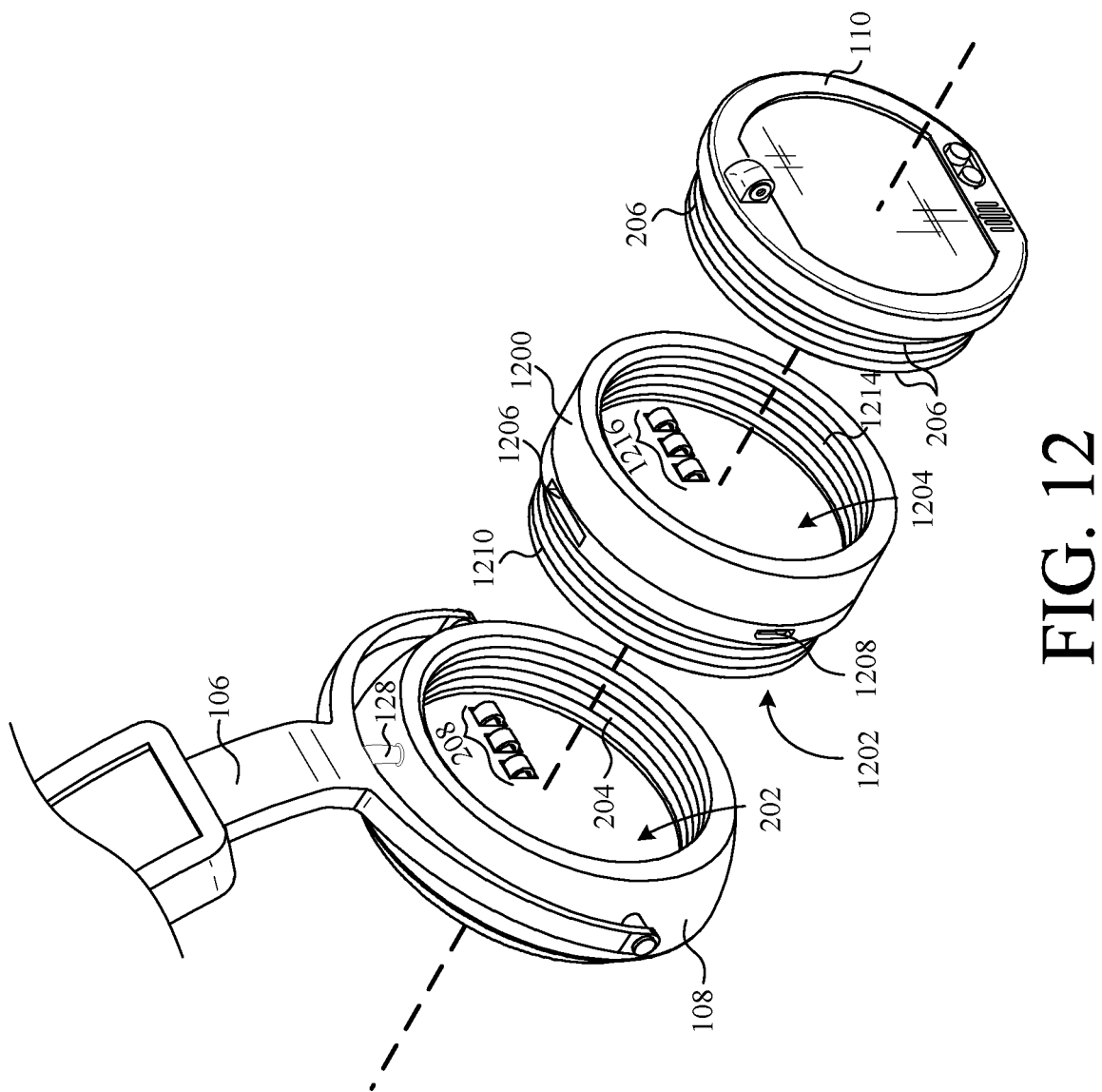
FIG. 12 is an exploded perspective view of an adapter according to an embodiment of the invention.

FIG. 12 shows a perspective view of an adapter 1200 disposed between speaker assembly 108 and a display unit 110. Adapter 1200 is operative to host adapter-enabled devices such as, for example, transparent displays, traditional displays, speakers, cameras, microphones, brainwave sensors, game controllers, batteries, etc. Adapter 1200 includes a male end 1202, a female end 1204, a custom port 1206, and a standard port 1208. Male end 1202 is substantially identical to the male end of display unit 110 and is, therefore, adapted to electrically and mechanically mate with recess 202. That is, male end 1202 includes threads 1210 and contacts 1212 (shown in FIG. 13) that are adapted to mate with threads 204 and contacts 208, respectively, of recess 202. Accordingly, contacts 1212 electrically couple to bus 128. Female end 1204 is substantially identical to recess 202 and is, therefore, adapted to electrically and mechanically mate with threads 206 and contacts 210 (FIG. 2) of display unit 110. More specifically, female end 1204 includes threads 1214 and contacts 1216 that are adapted to mate with threads 206 and contacts 210, respectively, of display unit 110. Accordingly, contacts 1216 are adapted to electrically couple contacts 210 of display unit 110 to bus 128.

Custom port 1206 facilitates the electrical coupling of adapter-enabled devices, such as a transparent display 702, to bus 128. In this example, custom port 1206 is substantially complementary to interface 708 of transparent display 702. Accordingly, prior headphone systems, such as headphone system 100, can be retrofitted with transparent display 702 using adapter 1200. Standard port 1208 further facilitates the electrical coupling of standard adapter coupled devices (e.g., cameras, displays, speakers, etc.) to bus 128. In the example embodiment, standard port 1208 is a universal serial bus (USB) port.

It should also be noted that multiple adapters 1200 can be nested to facilitate coupling of multiple adapter-enabled devices to the headphone system. For example, the male end 1202 of a first adapter 1200(1) can be installed in recess 202 to host a transparent display 702. The male end 1202 of a second adapter 1200(2) can then be installed in the female end 1204 of the first adapter 1200(1), such that the second adapter 1200(2) can host a 360-degree camera system. Thereafter, the display unit 110 can be screwed into the female end 1204 of the second adapter 1200(2). Indeed, nesting more than two adapters 1200 can add still more features to the headphone system.

It is further noted that adapters 1200 can be selectively installed on the speaker assembly 108 on both sides of the headphone system. For example, where the transparent display 702 includes two interfaces 708, each speaker assembly 108 of the headphone system can be retrofitted with an adapter 1200. As another example, multiple adapters 1200 can be distributed on different sides of the headphone system to improve symmetry, maintain weight balance, etc.

Figure 13:
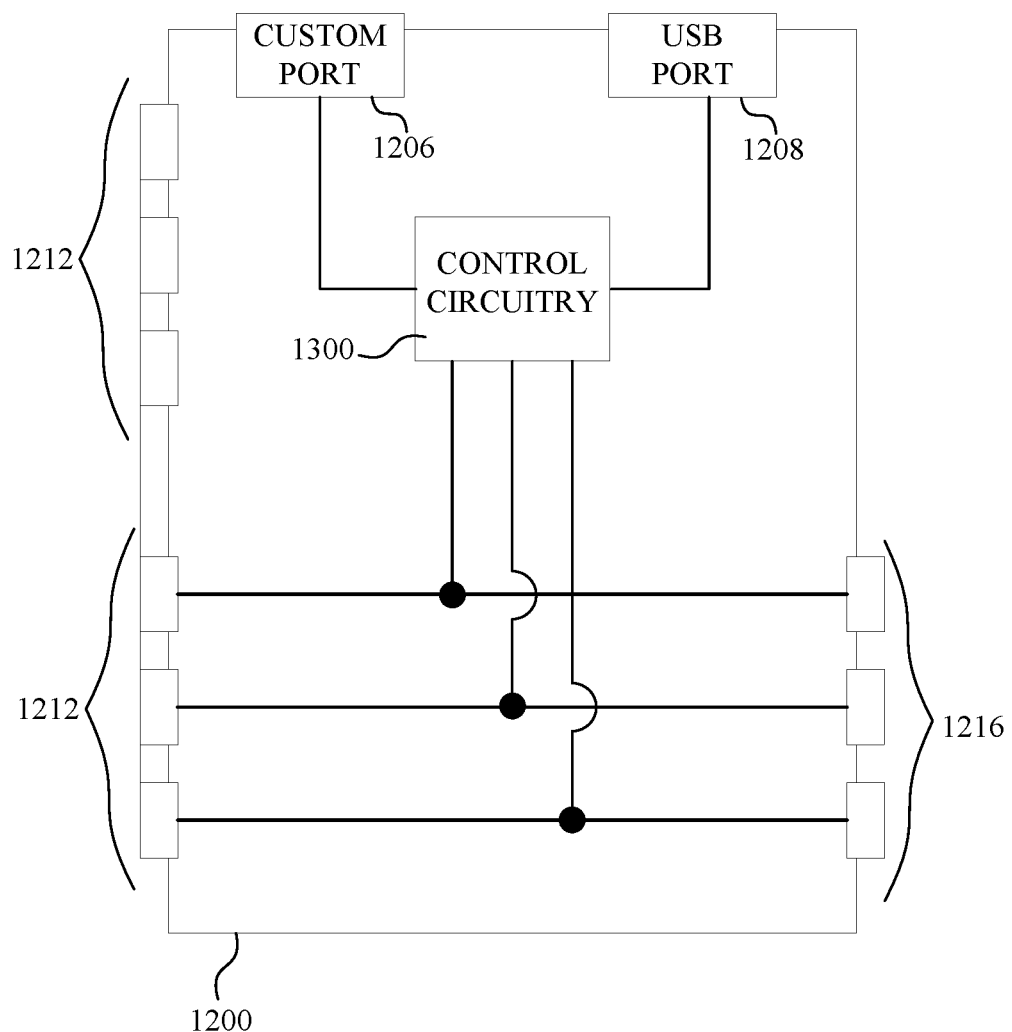
FIG. 13 is a circuit diagram of the adapter of FIG. 12.

FIG. 13 is a block diagram illustrating the circuitry of adapter 1200. As shown, each respective one of contacts 1212 of male end 1202 is electrically coupled to a respective one of contacts 1216 of female end 1204 such that contacts 210 of display unit 704 can indirectly couple to bus 128 through adapter 1200. Furthermore, each respective one of contacts 1212 and 1216 are electrically coupled to control circuitry 1300 of adapter 1200. Control circuitry 1300 is further electrically coupled to both custom port 1206 and standard port 1208 and facilitates coordination and control of the various functions of adapter 1200 and associated control signals.

Figure 14:
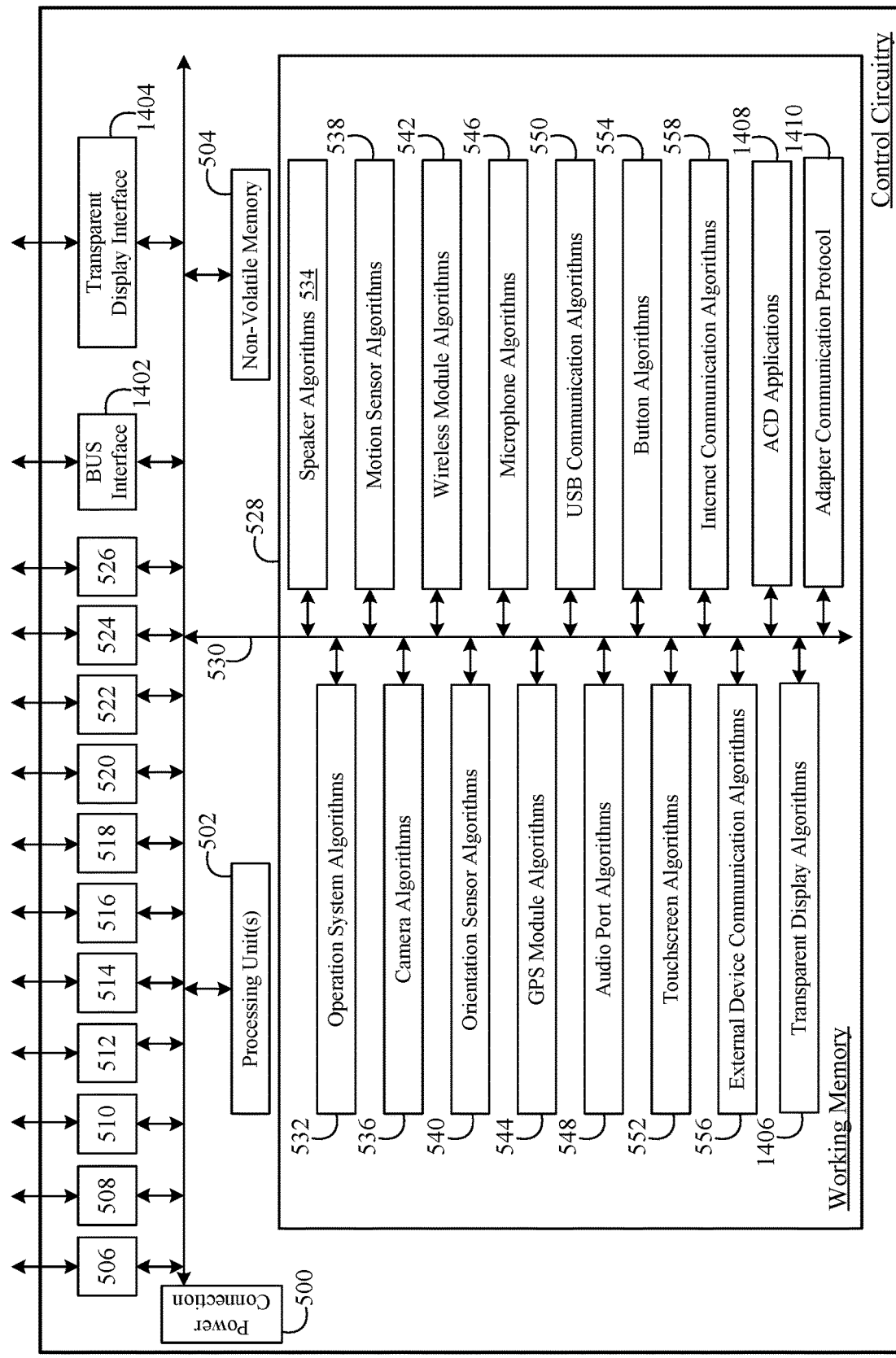
FIG. 14 is a block diagram of a controller for the headphone system of FIG. 7.

FIG. 14 is a block diagram of a control circuit 1400 of display unit 704. Control circuit 1400 is similar to control circuit 322 but is shown with a bus interface 1402 and transparent display interface 1404 coupled to system bus 530. Bus interface 1402 facilitates electrical connection and communication between control circuitry 1400 and bus 128. Transparent display interface 1404 facilitates the electrical connection of a transparent display, such as transparent display 702, to control circuitry 1400 via port 706.

Working memory 528 of FIG. 14 is shown to further include transparent display algorithms 1406, adapter coupled device (ACD) applications 1408, and an adapter communication protocol 1410. Transparent display algorithms 1406 facilitate control and operation of the transparent screen 806 of transparent display 702 to carry out the functions described herein. For example, algorithms 1406 can facilitate display of desired images on screen 806, cause screen 806 to darken like sunglasses, etc. ACD applications 1408 represent programs associated with adapter 1200 and devices coupled thereto and facilitate operation of the adapter and adapter-coupled device. Accordingly, ACD applications 1408 can be loaded into working memory 528 from adapter 1200. Adapter communications protocol 1410 facilitates communication between control circuitry 1400 of display unit 704 and control circuitry 1300 of adapter 1200.

Figure 15:
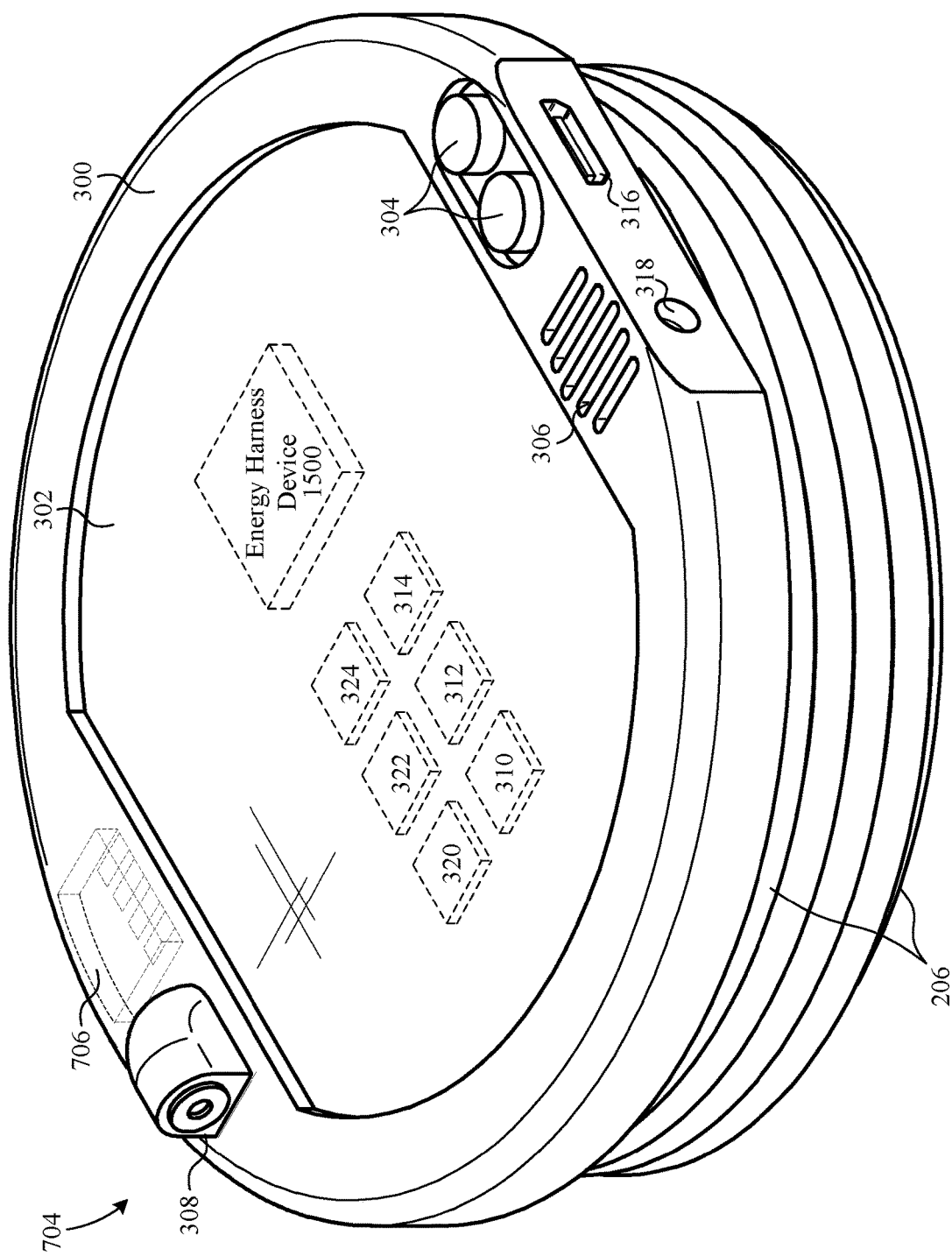
FIG. 15 is a perspective view of a display unit of the headphone system of FIG. 7.

FIG. 15 shows a perspective view of display unit 704 according to one embodiment of the present invention. Display unit 704 is similar to display unit 110 but further includes an energy harness device 1500 electrically coupled to battery 324 so as to extend the life of the battery 324. Energy harness device 1500 is, for example, a kinetic energy harnessing device that converts motion of display unit 704 (e.g., caused by user 400) into electrical energy that is stored in battery 324. Alternatively, energy harness device 1500 can be a solar panel that is located outside of unit 704 to convert impinging light into electrical energy that is stored in battery 324. FIG. 15 also shows the port formed in display unit 704 for interface 706.

The description of particular embodiments of the present invention is now complete. Many of the described features may be substituted, altered or omitted without departing from the scope of the invention. For example, alternate display types (e.g., LED screen, LCDs, etc.), may be substituted for display screen 302. As another example, alternate data/power cable types (e.g. HDMI, micro USB, mini USB, etc.), may be substituted for wire 104. As yet another example, interactive display unit (e.g., display unit 206) can operate independently outside of a headphone environment. For example, display unit 206 can be removed from speaker assembly 108 and installed into other compatible assemblies of other types of devices including, but not limited to, belt buckles, carry bags, waist wear, a cap/hat, a jacket or other clothing, and so on. When installed in such alternative assemblies, the interactive display functions will continue to function, but perhaps with a different set of accessory functions (e.g., audio might be unnecessary). These and other deviations from the particular embodiments shown will be apparent to those skilled in the art, particularly in view of the foregoing disclosure.

We claim:

1. A headphone system comprising:
   a first headset including
      a first frame having a first speaker connecting portion, a second speaker connecting portion, and a headband extending between said first speaker connecting portion and said second speaker connecting portion,
      a first speaker assembly coupled to said first speaker connecting portion of said first frame,
      a second speaker assembly coupled to said second speaker connecting portion of said first frame,
      a first display coupled to said first frame,
      a first user interface operative to receive input from a first user,
      first memory for storing data and code,
      a first camera configured to capture image data,
      a first wireless network adapter,
      a first controller coupled to said first frame, responsive to said input from said user and configured to execute said code and display images on said first display based at least in part on said input from said user, and
      a first detachable display unit removably coupled to said first frame, said first detachable display unit incorporating said first controller, said first memory, said first camera, said first display and said first wireless network adapter, said first display unit facing in a sideways direction relative to said first headset when said first detachable display unit is coupled to said first frame, said first camera directed in a forward direction with respect to said first headset when said first detachable display unit is coupled to said first frame, said first cameral being configured to capture said image data while said first detachable display unit is coupled to said first frame; and
   a second headset including
      a second frame having a first speaker connecting portion, a second speaker connecting portion, and a headband extending between said first speaker connecting portion and said second speaker connecting portion,
      a third speaker assembly coupled to said first speaker connecting portion of said second frame,
      a fourth speaker assembly coupled to said second speaker connecting portion of said second frame,
      a second display coupled to said second frame,
      a second user interface operative to receive input from a second user,
      second memory for storing data and code,
      a second camera configured to capture image data,
      a second wireless network adapter,
      a second controller coupled to said first frame, responsive to said input from said user and configured to execute said code and display images on said second display based at least in part on said input from said second user, and
      a second detachable display unit removably coupled to said second frame, said second detachable display unit incorporating said second controller, said second memory, said second camera, said second display, and said second wireless network adapter; and
   wherein
      said first controller is configured to provide first image data corresponding to an image captured by said first camera to said second controller via said first network adapter and said second network adapter; and said second controller is configured to receive said first image data and to display said image captured by said first camera on said second display while said second detachable display unit is coupled to said second frame.

2. The headphone system of claim 1, wherein:
said first network adapter is a local area network (LAN) adapter; and
said second network adapter is a local area network (LAN) adapter.

3. The headphone system of claim 1, wherein
said first network adapter is a wide-area network (WAN) adapter; and
said second network adapter is a wide-area network (WAN) adapter.

4. The headphone system of claim 1, wherein said first controller is configured to provide said first image data to said second controller via a direct connection between said first network adapter and said second network adapter.

5. The headphone system of claim 1, wherein said first controller is configured to provide said first image data to said second controller indirectly via a central server.

6. The headphone system of claim 1, wherein said first display faces away from said first user's head when said first headset is worn by said first user.

7. The headphone system of claim 6, wherein:
said first detachable display unit is coupled to said first speaker connecting portion of said first frame;
said first headset further includes a third display coupled to said second speaker connecting portion of said first frame; and
said third display faces away from said first user's head when said first headset is worn by said first user.

8. The headphone system of claim 7, wherein said first controller of said first headset is configured to receive second image data captured by said second camera of said second headset and display said second image data on said third display.

9. The headphone system of claim 7, wherein said third display is included in a third detachable display unit configured to selectively engage said second speaker connecting portion of said first headset.

10. The headphone system of claim 7, wherein:
said first headset includes a fourth display coupled to said headband of said first frame, a viewable surface of said fourth display facing upward; and
said first controller is configured to display a coordinated image on said first display, said third display, and said fourth display.

11. The headphone system of claim 1, further comprising a network server, said network server being configured to:
receive content data captured by said first headset;
provide said content data from said first headset to said second headset;
receive content data from said second headset; and
provide said content data from said second headset to said first headset.

12. The headphone system of claim 11, wherein:
said content data captured by said first headset is sound data; and
said content data captured by said second headset is sound data.

13. The headphone system of claim 11, wherein:
said content data captured by said first headset is image data; and
said content data captured by said second headset is image data.

14. The headphone system of claim 11, wherein said network server is further configured to:
augment said content data received from said first headset to create first augmented data;
provide said first augmented data to said second headset;
augment said content data received from said second headset to create second augmented data; and
provide said second augmented data to said first headset.

15. The headphone system of claim 11, wherein said network server is configured to:
augment said content data received from said first headset to create first augmented data; and
provide said first augmented data to a plurality of geographically separate headsets.

16. The headphone system of claim 1, further comprising:
a third detachable display unit; and wherein
said third detachable display unit is configured to be interchageable said first detachable display unit; and
said third detachable display unit is configured differently than said first detachable display unit.

17. The headphone system of claim 1, wherein said first detachable display unit additionally includes a microphone.

18. The headphone system of claim 1, wherein:
said first detachable display unit include a motion sensor; and
said first controller is configured to interpret data from said motion senor as user commands.

19. The headphone system of claim 18, wherein said motion sensor is an accelerometer.

20. The headphone system of claim 18, wherein said motion sensor is a tilt sensor.

* * * * *